(12) United States Patent
Mitsuda et al.

(10) Patent No.: US 6,327,407 B1
(45) Date of Patent: Dec. 4, 2001

(54) SEMICONDUCTOR LIGHT-RECEIVING DEVICE, METHOD OF MANUFACTURING THE SAME, BIDIRECTIONAL OPTICAL SEMICONDUCTOR DEVICE, AND OPTICAL TRANSMISSION SYSTEM

(75) Inventors: Masahiro Mitsuda, Kyoto; Tohru Nishikawa, Osaka; Tomoaki Uno, Hyogo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/187,401

(22) Filed: Nov. 6, 1998

(30) Foreign Application Priority Data

Nov. 7, 1997 (JP) .................................................. 9-305311

(51) Int. Cl.$^7$ ...................................................... G02B 6/30
(52) U.S. Cl. ................................. 385/49; 385/48; 385/91
(58) Field of Search ................................. 385/15, 31, 36, 385/37, 39, 44, 47–49, 88, 90, 91

(56) References Cited

U.S. PATENT DOCUMENTS

| | | | |
|---|---|---|---|
| 4,549,782 | * 10/1985 | Miller | 385/48 |
| 4,900,118 | * 2/1990 | Yanagawa et al. | 385/49 X |
| 5,497,438 | * 3/1996 | Ishikawa et al. | 385/47 X |
| 5,499,309 | 3/1996 | Kozuka et al. | 385/38 |
| 5,644,667 | * 7/1997 | Tabuchi | 385/49 |
| 5,671,316 | * 9/1997 | Yuhara et al. | 385/49 X |
| 6,132,107 | * 10/2000 | Morikawa | 385/49 X |

FOREIGN PATENT DOCUMENTS 59-185306 * 10/1984 (JP) .
05093827   4/1993 (JP) .
WO97/06458  2/1997 (WO) .

OTHER PUBLICATIONS

T. Uno et al., et al., "Hybrid integration of 1.3–$\mu$m transmitter and 1.55–$\mu$m receiver with fiber-embedded circuit":, OFC, '97 Technical Digest, Thl3, Thursday Morning, pp.(s) 277 and 278, 1997.

Y. Yamada, "Opto-electronic Hybrid Integration with PLC Platform".
OPTRONICS (1996) No. 7, pp.(s) 139–143, (partial English translation thereof).

* cited by examiner

Primary Examiner—John D. Lee
(74) Attorney, Agent, or Firm—Eric J. Robinson; Nixon Peabody LLP

(57) ABSTRACT

A semiconductor light-receiving device comprises a substrate, an optical fiber, a semiconductor light-receiving element, an optical member, and holders. A groove for a buried optical fiber is formed in the main surface of the substrate to extend from one end of the substrate to the other end thereof. The optical fiber is buried in the optical fiber groove and covered with a resin material. The semiconductor light-receiving element has a light-receiving portion at a surface thereof in opposing relation to the main surface of the substrate and is disposed on the main surface of the substrate via bumps such that the light-receiving portion is opposed to the optical fiber. The optical member is disposed in the substrate in an intersecting relationship with the optical fiber to reflect or diffract signal light propagated through the optical fiber and irradiate the light-receiving portion of the semiconductor light-receiving element with the reflected or diffracted signal light. The holders are provided in the substrate to suppress a temperature-dependent variation in the width of the optical fiber groove.

34 Claims, 13 Drawing Sheets

SEMICONDUCTOR LIGHT-RECEIVING DEVICE, METHOD OF MANUFACTURING THE SAME, BIDIRECTIONAL OPTICAL SEMICONDUCTOR DEVICE, AND OPTICAL TRANSMISSION SYSTEM

BACKGROUND OF THE INVENTION

The present invention relates to a semiconductor light-receiving device simple in structure and improved in long-term reliability, a method of manufacturing the same, a bidirectional optical semiconductor device, and an optical transmission system.

In a bidirectional optical communication system such as a fiber-optic subscriber system, an optical transmitter and an optical receiver should be installed at each of the provider's office and the subscriber's residence. Signal light from the provider is received by the optical receiver at the subscriber's residence through an optical fiber as a transmission line, while signal light from the subscriber is also transmitted to the provider's office through the same transmission line used in receiving the signal light. Normally, a semiconductor laser is used in the optical transmitter, while a photodetector is used in the optical receiver. Optical multiplexing/demultiplexing of signals transmitted in both directions is performed by a coupler.

To bring an optical module used in the optical communication system into ordinary households, it is essential to provide a lower-cost optical module that has been scaled down by reducing the component count thereof.

The following three structures have been reported as respective examples of the major components of the lower-cost optical module for use at home. Specifically, they are: an optical transmitter which achieves direct coupling between a semiconductor laser and an optical fiber by increasing working accuracy for a substrate; a coupler for performing optical multiplexing/demultiplexing which uses a PLC (planar lightwave circuit) to allow mass production of a smaller-size optical waveguide element; and an optical receiver having an optical fiber buried in a substrate and a mirror inserted in the substrate obliquely to the optical fiber such that signal light reflected by the mirror is received by a photodetector.

To compose the optical module for use in bidirectional optical communication, it is also necessary to combine the optical transmitter with the optical receiver. As examples of the integrated structure, the following two have been reported. The first structure is obtained by coupling a coupler fabricated by using a PLC to an optical fiber, a semiconductor laser, and a photodiode which have been assembled with mechanical accuracy. The first structure is reported in detail in, e.g., *Optolonics*, (1996) No.7, pp.139–143. The second structure is obtained by coupling a semiconductor laser directly to an optical fiber buried in a photodiode. The second structure is reported in detail in, e.g., *OFC'97 Technical Digest Thl3*.

Although the first structure using the PLC is suitable for mass production because of the coupler that can be manufactured by using process technology, it presents the problem of a high loss at the coupling portion between the optical fiber and the PLC.

As a solution to the problem presented by the first structure, the second structure using the photodiode with the buried optical fiber will be described with reference to the drawings.

FIG. 14 is a perspective view of a conventional semiconductor light-receiving device with a buried optical fiber.

FIG. 15 shows a cross section taken along the line I—I of FIG. 14. As shown in FIGS. 14 and 15, a groove 101a for an optical fiber is formed in a main surface of a substrate 101 made of glass. An optical fiber 102 is buried as a transmission line for signal light in the optical fiber groove 101a with a UV curable resin material 103 filled in the gap between the optical fiber 102 and the optical fiber groove 101a.

Patterned electrodes 104 each made of gold are formed on the main surface of the substrate 101. A plurality of bumps 105 each made of gold are formed on the respective portions of the patterned electrodes 104 corresponding to the p-side and n-side electrode terminals of a light-receiving element. A photodiode 106 as the light-receiving element is disposed on the main surface of the substrate 101 such that the p-side and n-side electrode terminals each made of gold and formed on the light-receiving surface of the photodiode 106 are in contact with and electrically connected to the corresponding bumps 105. The UV curable resin material 103 is filled in the gap between the main surface of the substrate 101 and the light-receiving surface of the photodiode 106 to achieve bonding by using a so-called microbump bonding (MBB) process. As the UV curable resin material 103, a resin material transparent at the wavelength of signal light propagated through the optical fiber 102 and having a refractive index substantially the same as that of the optical fiber 102.

A mirror 107 for reflecting the signal light propagated through the optical fiber 102 under the photodiode 106 is also disposed in the main surface of the substrate 101. The mirror 107 intersects the optical fiber 102 at such an angle as to irradiate the light-receiving portion of the photodiode 106 with the reflected signal light, thereby allowing the photodiode 106 having the light-receiving surface parallel to the optical axis of the optical fiber 102 to receive the signal light propagated through the optical fiber 102 and reflected by the mirror 107 without high-accuracy alignment.

To constitute an optical module for bidirectional communication by using the semiconductor light-receiving device, it is sufficient to couple a semiconductor laser element directly to the terminal of the optical fiber 102 opposite to the photodiode 106 relative to the mirror 107.

Although the conventional semiconductor light-receiving device with the buried optical fiber suffers only a low signal loss because the optical fiber is used to form a waveguide without using a PLC, the UV curable resin material 103 filled in the gap between the optical fiber 102 and the photodiode 106 has a linear expansion coefficient higher than those of glass and a semiconductor, so that stresses are applied at high temperatures in such directions as to bring the bumps 105 away from each other and to bring the substrate 101 and the photodiode 106 away from each other, as shown in FIG. 15. On the other hand, stresses are applied at low temperatures in such directions as to bring the bumps 105 closer to each other and to bring the substrate 101 and the photodiode 106 closer to each other. What results is the first problem that faulty connections are likely to occur at the bumps 105 in the conventional semiconductor light-receiving device with the buried optical fiber.

Moreover, since the resin material generally softens at a temperature over the glass transition temperature Tg, the optical fiber 102 moves in the resin to vary the distance between the optical fiber 102 and the mirror 107 and hence the quantity of signal light directed to the light-receiving surface of the photodiode 106, resulting in the second problem of unstable receiving operation.

Thus, the photodiode with the buried optical fiber cannot provide long-term reliability because the resin material used in large quantity is susceptible to variations in ambient temperature and moisture, though it is reduced in signal light loss owing to the optical fiber used to form the waveguide and cost-effective owing to the ability to transmit signal light and to the resin material used in large quantity at the fixed portion.

When the photodiode and the semiconductor element are bonded simultaneously to the circuit board by reflow soldering, the conventional semiconductor light-receiving device is required not to be destroyed under high-temperature conditions at 183° C. or higher in the case of using a lead-tin eutectic solder material or at a minimum temperature of a hundred and several tens of degrees in the case of using a low-melting-point solder material, so that the use of such a large amount of resin material involves trouble.

In the case of using a general-purpose lead-tin eutectic solder material in the bumps 105, as shown in FIG. 16, there occurs the third problem that a crack gradually develops at the interface between the bump 105 and the patterned electrode 104 in the course of alternately and repeatedly increasing and decreasing temperature, which leads to an electrical disconnection.

SUMMARY OF THE INVENTION

In view of the foregoing problems, it is therefore an object of the present invention to provide a semiconductor light-receiving device having a simple structure and high reliability which prevents efficiency of signal light conversion from lowering.

A first semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove to be covered with a resin material; a semiconductor light-receiving element having a light-receiving portion at a surface thereof in opposing relation to the main surface of the substrate, the semiconductor light-receiving element being disposed on the main surface of the substrate via a bump such that the light-receiving portion is opposed to the optical fiber; an optical member disposed in the substrate to intersect the optical fiber, the optical member reflecting or diffracting signal light propagated through the optical fiber and irradiating the light-receiving portion of the semiconductor light-receiving element with the reflected or diffracted signal light; and a holder disposed in the substrate to suppress a temperature-dependent variation in a width of the optical fiber groove.

In the first semiconductor light-receiving device, the width of the optical fiber groove is less likely to vary even when the resin material used to fix the optical fiber to the substrate expands or contracts due to the linear expansion coefficient of the resin material which is higher than those of the substrate, the semiconductor, and the like. As a result, stress is less likely to be applied along the surface of the substrate to the bump for providing an electrical connection between the substrate and the semiconductor light-receiving element. This prevents the bump from being displaced from a predetermined position and suppresses faulty conduction, resulting in a semiconductor light-receiving device having a comparatively simple structure and improved long-term reliability against a temperature variation.

In the first semiconductor light-receiving device, the holder preferably has a linear expansion coefficient substantially the same as that of the substrate. In the arrangement, the holder prevents a volume variation other than that caused by the expansion or contraction of the substrate, so that the holder is prevented from causing a variation in the width of the optical fiber groove.

In the first semiconductor light-receiving device, the holder preferably has a linear expansion coefficient substantially the same as that of the semiconductor light-receiving element. The arrangement suppresses not only a variation in the width of the optical fiber groove due to the contraction or expansion of the resin material but also a variation in the width of the optical fiber groove due to the contraction or expansion of the semiconductor light-receiving element.

A second semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove to be covered with a resin material; a semiconductor light-receiving element having a light-receiving portion at a surface thereof in opposing relation to the main surface of the substrate, the semiconductor light-receiving element being disposed on the main surface of the substrate via a bump such that the light-receiving portion is opposed to the optical fiber; and an optical member disposed in the substrate to intersect the optical fiber, the optical member reflecting or diffracting signal light propagated through the optical fiber and irradiating the light-receiving portion of the semiconductor light-receiving element with the reflected or diffracted signal light, the optical fiber groove having a depth substantially equal to an outer diameter of the optical fiber.

Since only a reduced amount of resin material is sufficient to fill in the gap between the substrate and the optical fiber in the second semiconductor light-receiving device, even when the resin material having a linear expansion coefficient higher than those of the substrate, the semiconductor, and the like expands or contracts due to a temperature variation, a volume variation caused by the expansion or contraction of the resin material is minimized. As a result, stress applied to the bump along the surface of the substrate is reduced and the bump is no more displaced from a predetermined position, which suppresses faulty conduction and provides a semiconductor light-receiving device having a comparatively simple structure and improved long-term reliability.

In the second semiconductor light-receiving device, the light-receiving portion of the semiconductor light-receiving element is preferably offset from the center of the surface of the semiconductor light-receiving element in opposing relation to the main surface of the substrate toward the optical member in a direction in which the signal light is propagated. In the arrangement, the depth of the optical fiber groove is reduced compared with the conventional embodiment and, even if the optical axis of the optical fiber is closer to the main surface of the substrate, the light-receiving portion is positively irradiated with the signal light propagated through the optical fiber.

In the second semiconductor light-receiving device, the optical member is preferably disposed in the substrate to underlie the semiconductor light-receiving element. In the arrangement, the depth of the optical fiber groove is reduced compared with the conventional embodiment and, even if the light-receiving portion is provided at the center of the light-receiving surface of the semiconductor light-receiving element, the optical member disposed in the region of the substrate to underlie the semiconductor light-receiving element ensures the irradiation of the light-receiving portion of the semiconductor light-receiving element with the reflected signal light.

A third semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove to be covered with a resin material; a semiconductor light-receiving element having a light-receiving portion at a surface thereof in opposing relation to the main surface of the substrate, the semiconductor light-receiving element being disposed on the main surface of the substrate via a plurality of bumps such that the light-receiving portion is opposed to the optical fiber; and an optical member disposed in the substrate to intersect the optical fiber, the optical member reflecting or diffracting signal light propagated through the optical fiber and irradiating the light-receiving portion of the semiconductor light-receiving element with the reflected or diffracted signal light, the plurality of bumps being aligned in two rows located on both sides of the optical fiber groove formed in the main surface of the substrate and extending parallel to each other along the optical fiber groove.

In the third semiconductor light-receiving device, the distances between the individual bumps and the optical fiber groove are equal in the region of the main surface of the substrate located on the side of the optical fiber groove even when the resin material expands or contracts due to the linear expansion coefficient thereof higher than those of the substrate, the semiconductor, and the like and the expansion or contraction of the resin material brings the bumps closer to or away from each other around an axis constituted by the portion of the back face of the substrate underlying the center of the bottom of the optical fiber groove. Consequently, none of the plurality of bumps suffers faulty connection alone. This is because, if any of the plurality of bumps is disposed to have a minimum distance from the optical fiber groove, only the bump having the minimum distance is in contact, while the other bumps are prevented from contact. Therefore, even when a temperature variation occurs, faulty conduction due to the displacement of the bumps from predetermined positions is suppressed, resulting in a semiconductor light-receiving device having a comparatively simple structure and improved long-term reliability.

In the third semiconductor light-receiving device, some of the plurality of bumps are preferably conducting bumps electrically connected to the semiconductor light-receiving element, while the others of the plurality of bumps are preferably support bumps for supporting the semiconductor light-receiving element, patterned electrodes are preferably formed on a region of the main surface of the substrate located on a side of the optical fiber groove to correspond to the conducting bumps electrically connected to the semiconductor light-receiving element, and the conducting bumps are preferably at smaller distances from the optical fiber groove than the support bumps. In the arrangement, the resin material expands when the device operates at a comparatively high ambient temperature so that the width of the optical fiber groove is constantly larger than in the manufacturing process. In this case, ensured conduction is achieved since the bumps are prevented from being greatly displaced from predetermined positions. On the other hand, the semiconductor light-receiving element gains sufficient strength against pressure exerted thereon during bonding in the manufacturing process since the rows of bumps have nonlinear configurations.

In the third semiconductor light-receiving device, some of the plurality of bumps are preferably conducting bumps electrically connected to the semiconductor light-receiving element, while the others of the plurality of bumps are support bumps for supporting the semiconductor light-receiving element, patterned electrode are preferably formed on a region of the main surface of the substrate located on a side of the optical fiber groove to correspond to the conducting bumps electrically connected to the semiconductor light-receiving element, and the conducting bumps are preferably at greater distances from the optical fiber groove than the support bumps. In the arrangement, the resin material contracts when the device operates at a comparatively low ambient temperature so that the width of the optical fiber groove is constantly larger than in the manufacturing process. In this case, ensured conduction is achieved since the bumps are prevented from being greatly displaced from predetermined positions. On the other hand, the semiconductor light-receiving element gains sufficient strength against pressure exerted thereon during bonding in the manufacturing process since the rows of bumps have nonlinear configurations.

A fourth semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove; a semiconductor light-receiving element having a light-receiving portion at a surface thereof in opposing relation to the main surface of the substrate, the semiconductor light-receiving element being disposed on the main surface of the substrate via a bump such that the light-receiving portion is opposed to the optical fiber; and an optical member disposed in the substrate to intersect the optical fiber, the optical member reflecting or diffracting signal light propagated through the optical fiber and irradiating the light-receiving portion of the semiconductor light-receiving element with the reflected or diffracted signal light, the optical fiber being fixed in the optical fiber groove with a resin material filled in a gap between the optical fiber groove and the optical fiber in a region of the substrate in opposing relation to the semiconductor light-receiving element and with a fixing member disposed in a gap between the optical fiber groove and the optical fiber in a region of the substrate not in opposing relation to the semiconductor light-receiving element.

Even when ambient temperature exceeds the glass transition temperature to soften the resin material in the fourth semiconductor light-receiving device, the portion of the optical fiber not in opposing relation to the semiconductor light-receiving element is fixed by the fixing member, so that the optical fiber is prevented from being displaced. Therefore, the position of the optical fiber and the distance between the optical member and the light-receiving surface do not vary even under conditions of varying temperature, which causes no variation in the quantity of signal light directed to the light-receiving surface and no trouble during receiving operation, resulting in improved reliability against a temperature variation.

In the fourth semiconductor light-receiving device, the fixing member is preferably made of a solder material. The arrangement ensures the fixation to the substrate of the portion of the optical fiber not in opposing relation to the semiconductor light-receiving element.

In the fourth semiconductor light-receiving device, the fixing member is preferably made of a glass material. The arrangement ensures the fixation to the substrate of the portion of the optical fiber not in opposing relation to the semiconductor light-receiving element. In the case of using a glass substrate, no thermal distortion due to a temperature variation occurs because of equal linear expansion coefficients, resulting in further improved long-term reliability.

A fifth semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove to be covered with a resin material; a semiconductor light-receiving element having a light-receiving portion at a surface thereof in opposing relation to the main surface of the substrate, the semiconductor light-receiving element being disposed on the main surface of the substrate via a bump such that the light-receiving portion is opposed to the optical fiber; and an optical member disposed in the substrate to intersect the optical fiber, the optical member reflecting or diffracting signal light propagated through the optical fiber and irradiating the light-receiving portion of the semiconductor light-receiving element with the reflected or diffracted signal light, wherein a patterned electrode made of gold and electrically connected to the bump is formed on a region of the main surface of the substrate located on a side of the optical fiber groove and a metal thin film is formed between the patterned electrode and the bump.

In the fifth semiconductor light-receiving device, even when the bump is made of the solder material containing tin, tin contained in the bump is prevented from being diffused toward the patterned electrode containing gold and formed on the substrate. This prevents gold contained in the patterned electrode from forming a gold-tin alloy with a reduced mechanical strength. Since a crack due to a temperature variation is no more produced, faulty conduction is suppressed, resulting in improved reliability against a temperature variation.

In the fifth semiconductor light-receiving device, the bump is preferably made of a solder material containing lead and tin and the metal thin film preferably contains at least one of nickel, platinum, titanium, and chromium. The arrangement positively suppresses the diffusion of tin contained in the solder material toward the patterned electrode.

In the fifth semiconductor light-receiving device, the bump is preferably made of a solder material containing lead and tin and the metal thin film is preferably made of a solder material containing indium. In the arrangement, an indium-tin alloy having a low growth rate is formed by tin contained in the bump and indium contained in the solder material so that the diffusion of tin toward the patterned electrode is prevented. Moreover, the use of the solder material does not degrade working efficiency compared with the case where a metal thin film is formed.

A sixth semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove to be covered with a resin material; a semiconductor light-receiving element having a light-receiving portion at a surface thereof in opposing relation to the main surface of the substrate, the semiconductor light-receiving element being disposed on the main surface of the substrate via a bump such that the light-receiving portion is opposed to the optical fiber; and an optical member disposed in the substrate to intersect the optical fiber, the optical member reflecting or diffracting signal light propagated through the optical fiber and irradiating the light-receiving portion of the semiconductor light-receiving element with the reflected or diffracted signal light, wherein an electrode terminal made of gold is formed on the surface of the semiconductor light-receiving element provided with the light-receiving portion and a metal thin film is formed between the electrode terminal and the bump.

In the sixth semiconductor light-receiving device, even hen the bump is made of the solder material containing tin, tin contained in the bump is prevented from being diffused toward the electrode terminal of the semiconductor light-receiving element containing gold. This prevents degraded light-receiving sensitivity and faulty conduction, resulting in improved reliability against a temperature variation.

In the sixth semiconductor light-receiving device, the bump is preferably made of a solder material containing lead and tin and the metal thin film preferably contains at least one of nickel, platinum, titanium, and chromium. The arrangement positively prevents the diffusion of tin contained in the solder material toward the patterned electrode.

In the sixth semiconductor light-receiving device, the bump is preferably made of a solder material containing lead and tin and the metal thin film is preferably made of a solder material containing indium. In the arrangement, an indium-tin alloy having a low growth rate is formed by tin contained in the bump and indium contained in the solder material so that the diffusion of tin toward the patterned electrode is prevented. Moreover, the use of the solder material does not degrade working efficiency compared with the case where a metal thin film is formed.

A seventh semiconductor light-receiving device according to the present invention comprises: a substrate having a groove for a buried optical fiber, the optical fiber groove being formed in a main surface of the substrate to extend from one end of the substrate to the other end thereof; an optical fiber buried in the optical fiber groove to be covered with a resin material; a semiconductor light-receiving element having a light-receiving portion at a surface thereof in opposing relation to the main surface of the substrate, the semiconductor light-receiving element being disposed on the main surface of the substrate via a bump such that the light-receiving portion is opposed to the optical fiber; and an optical member disposed in the substrate to intersect the optical fiber, the optical member reflecting or diffracting signal light propagated through the optical fiber and irradiating the light-receiving portion of the semiconductor light-receiving element with the reflected or diffracted signal light, the bump being composed of a multilayer film containing a metal thin film made of a solder material.

In the seventh semiconductor light-receiving device, even if the solder material melts to spread over the peripheral portion of the bump, a short circuit between the bump is prevented because the amount of the solder material is small. This improves yield during the manufacturing of the device.

In the seventh semiconductor light-receiving device, the multilayer film is preferably composed of solder materials different in composition and stacked in layers. In the arrangement, even when the bump is made of a lead-tin eutectic solder material having high workability, the melting point thereof is increased if the composition of tin is reduced, so that the bump is prevented from melting and causing a short circuit between the electrodes.

In the seventh semiconductor light-receiving device, the multilayer film preferably contains a layer made of gold. In the arrangement, the bump for providing conduction positively achieves the intended performance.

A first method of manufacturing a semiconductor light-receiving device according to the present invention comprises the steps of: forming a patterned electrode on a main surface of a substrate; forming a bump on the patterned electrode; forming a groove for a buried optical fiber in the main surface of the substrate such that the optical fiber groove extends from one end of the substrate to the other end thereof; burying an optical fiber in the optical fiber groove and filling a resin material transparent at a wavelength of signal light propagated through the optical fiber and having a refractive index substantially the same as that of the optical fiber in a gap between the optical fiber groove and the optical fiber; providing the substrate with a holder for suppressing a temperature-dependent variation in a width of the optical fiber groove; providing the substrate with an optical member for reflecting or diffracting the signal light propagated through the optical fiber and emitting the reflected signal light upwardly of the main surface of the substrate such that the optical member intersects the optical fiber groove; and fixing, to the substrate, a semiconductor light-receiving element having a light-receiving portion formed with an electrode terminal such that the light-receiving portion is irradiated with the reflected signal light from the optical member and that the electrode terminal is brought in contact with the bump.

The first method of manufacturing a semiconductor light-receiving device ensures the manufacturing of the first semiconductor light-receiving device according to the present invention.

A second method of manufacturing a semiconductor light-receiving device according to the present invention comprises the steps of: forming a patterned electrode on a region of a main surface of a substrate to be provided with a semiconductor light-receiving element; forming a bump on the patterned electrode on the main surface of the substrate; forming a groove for a buried optical fiber in the main surface of the substrate such that the optical fiber groove extends from one end of the substrate to the other end thereof; burying an optical fiber in the optical fiber groove and disposing a fixing member for fixing the optical fiber to the substrate in a gap between the optical fiber groove and the optical fiber except in the region of the substrate to be provided with the light-receiving element; filling a resin material transparent at a wavelength of signal light propagated through the optical fiber and having a refractive index substantially the same as that of the optical fiber in the gap between the optical fiber groove and the optical fiber in the region of the substrate to be provided with the light-receiving element; providing the substrate with an optical member for reflecting or diffracting the signal light propagated through the optical fiber and emitting the reflected signal light upwardly of the main surface of the substrate such that the optical member intersects the optical fiber groove; and fixing, to the substrate, the semiconductor light-receiving element having a light-receiving portion formed with an electrode terminal such that the light-receiving portion is irradiated with the reflected signal light from the optical member and that the electrode terminal is brought in contact with the bump.

The second method of manufacturing a semiconductor light-receiving device ensures the manufacturing of the fourth semiconductor light-receiving device according to the present invention.

In the second method of manufacturing a semiconductor light-receiving device, the fixing member is preferably made of a solder material or a glass material.

A first bidirectional optical semiconductor device according to the present invention comprises: any one of the first to seventh semiconductor light-receiving devices; and a semiconductor light-emitting element for outputting signal light, the semiconductor light-emitting element being connected to an end of the optical fiber toward which the signal light received by the semiconductor light-receiving device is propagated.

Since the bidirectional optical semiconductor device according to the present invention uses any one of the first to seventh semiconductor light-receiving devices according to the present invention in the light receiver portion thereof, improved long-term reliability is provided with a comparatively simple structure.

A first optical transmission system according to the present invention comprises: a semiconductor light-emitting device for emitting signal light; a transmission line for transmitting the signal light; and a semiconductor light-receiving device for receiving the signal light transmitted by the transmission line, the semiconductor light-receiving device being composed of any one of the first to seventh semiconductor light-receiving devices.

Since the first optical transmission system uses any one of the first to seventh semiconductor light-receiving devices according to the present invention in the semiconductor light-receiving device thereof, improved long-term reliability is provided with a comparatively simple structure.

A second optical transmission system according to the present invention comprises: a bidirectional optical semiconductor device having a semiconductor light-emitting element for emitting signal light and a semiconductor light-receiving element for receiving the signal light; and an optical fiber for transmitting the signal light, the bidirectional optical semiconductor device being composed of the bidirectional optical semiconductor device according to the present invention.

Since the second optical transmission system uses the bidirectional optical semiconductor device according to the present invention, improved long-term reliability is provided with a comparatively simple structure.

DETAILED DESCRIPTION OF THE INVENTION

EMBODIMENT 1

A first embodiment of the present invention will be described with reference to the drawings.

Figure 1:
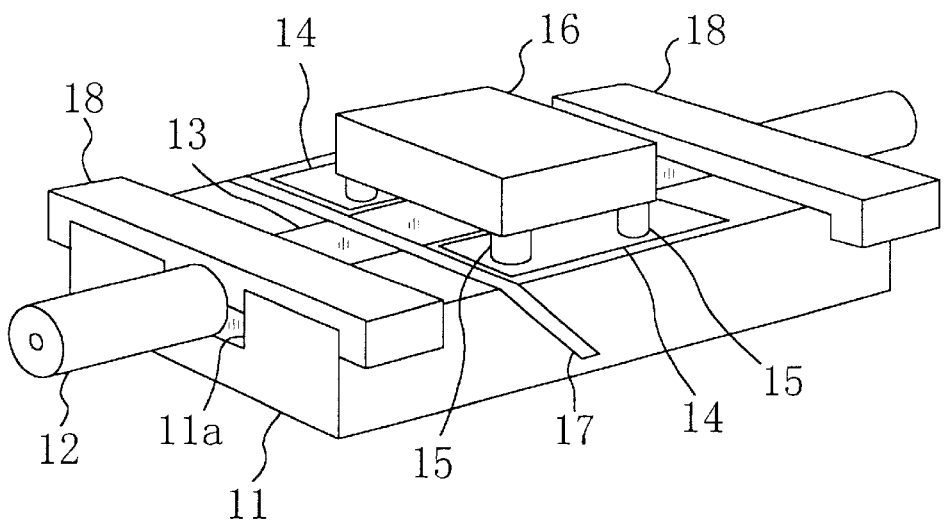
FIG. 1 is a perspective view of a semiconductor light-receiving device with a buried optical fiber according to a first embodiment of the present invention.

FIG. 1 is a perspective view of a semiconductor light-receiving device with a buried optical fiber according to the first embodiment. As shown in FIG. 1, a groove 11a in which an optical fiber 12 as a transmission line is buried is formed in the main surface of a substrate 11 made of glass. The optical fiber 12 is buried in the optical fiber groove 11a with a UV curable resin material 13 filled in the gap between the optical fiber 12 and the optical fiber groove 11a and covering the top surface of the optical fiber 12. As the UV curable resin material 13, a resin material transparent at the wavelength of signal light propagated through the optical fiber 12 and having a refractive index substantially the same as that of the optical fiber 12 is used.

Patterned electrodes 14 are formed on the main surface of the substrate 11. A plurality of bumps 15 each made of gold are formed on the portions of the patterned electrodes 14 corresponding to the p-side and n-side electrode terminals of a light-receiving element. A photodiode 16 as the semiconductor light-receiving element is disposed on the main surface of the substrate 11 such that the p-side and n-side electrode terminals each made of gold and formed on the light-receiving surface of the photodiode 16 are in contact with and electrically connected to the corresponding bumps 15.

The UV curable resin material 13 is filled in the gap between the main surface of the substrate 11 and the light-receiving surface of the photodiode 16 to achieve bonding by using an MBB process.

A mirror 17 for reflecting the signal light propagated through the optical fiber 12 under the photodiode 16 is also formed in the main surface of the substrate 11. The mirror 17 intersects the optical fiber 12 at such an angle as to partially or entirely irradiate the light-receiving portion of the photodiode 16 with the reflected signal light, thereby allowing the photodiode 106 having the light-receiving surface parallel to the optical axis of the optical fiber 102 to receive the signal light propagated through the optical fiber 102 and reflected by the mirror 107 without high-accuracy alignment.

A pair of holders 18 each made of quartz glass having a linear expansion coefficient lower than that of the UV curable resin material 13 are disposed in the respective both end portions of the substrate 11 orthogonally to the optical axis of the optical fiber 12. Each of the holders 18 has a projecting portion to be fitted into the upper portion of the optical fiber groove 11a and extends over the optical fiber groove 11a to hold the both edge portions of the substrate 11 located on both sides of the optical fiber groove 11a. This suppresses a variation in the width of the optical fiber groove 11a formed in the substrate 11 even when the UV curable resin material 13 expands or contracts due to a variation in ambient temperature.

Figure 2:
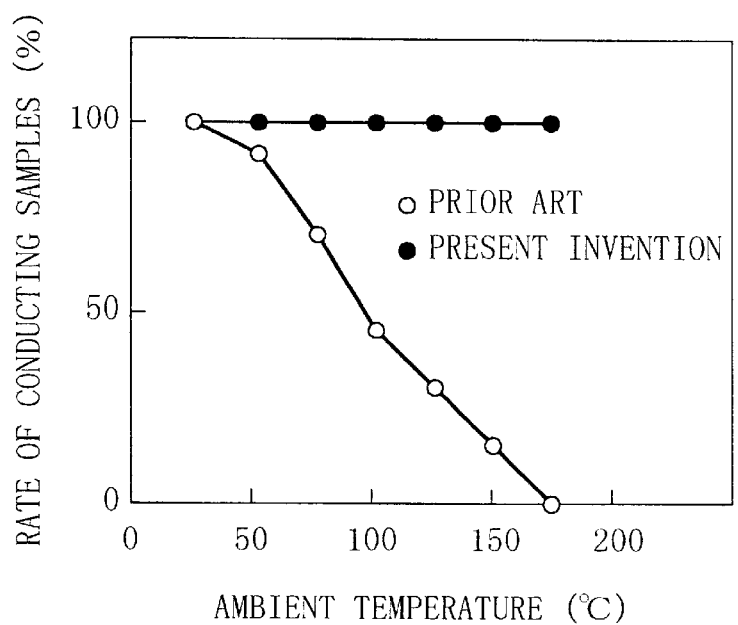
FIG. 2 is a graph showing the dependence of the rate of conducting samples on ambient temperature in each of the semiconductor light-receiving device according to the first embodiment and a conventional semiconductor light-receiving device.
Figure 14:
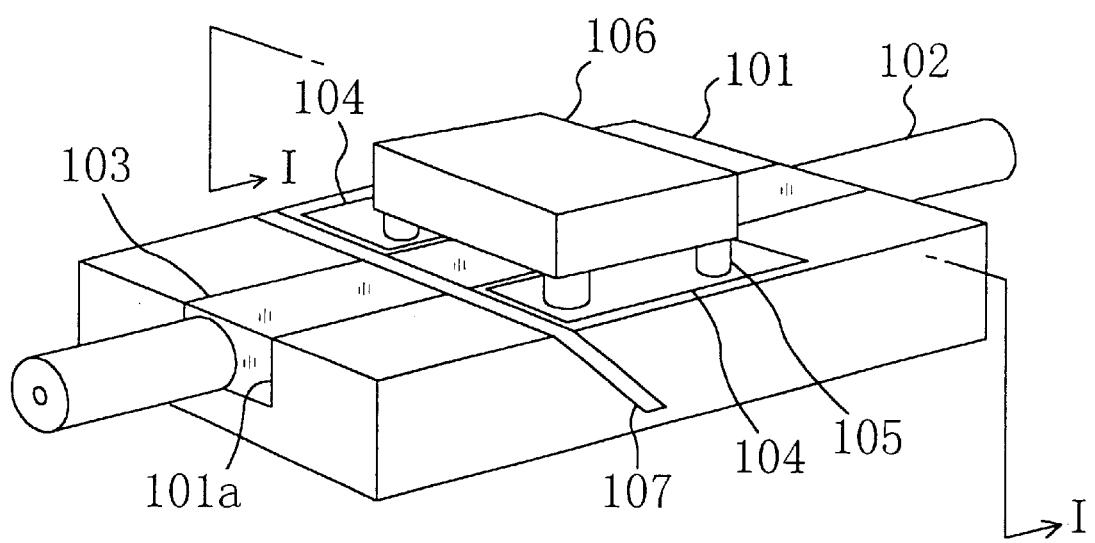
FIG. 14 is a perspective view of the conventional semiconductor light-receiving device with the buried optical fiber.
Figure 15:
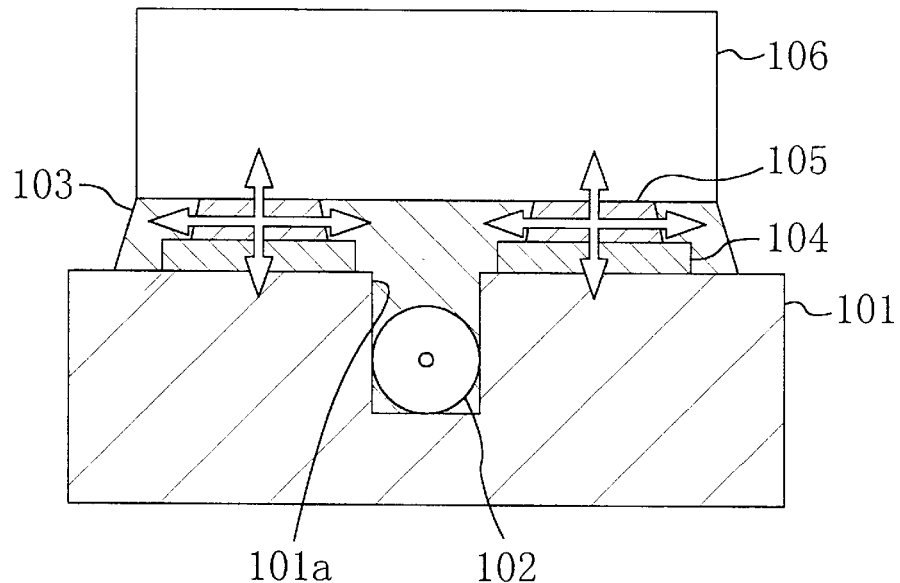
FIG. 15 is a cross-sectional view of the conventional semiconductor light-receiving device with the buried optical fiber, which has been taken along the line I—I of FIG. 14.
Figure 16:
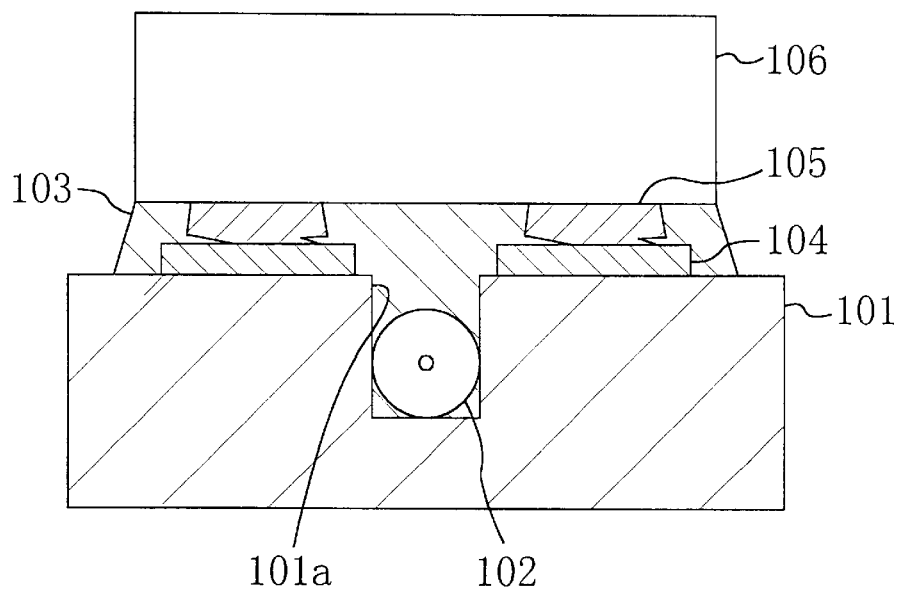
FIG. 16 is a cross-sectional view of the conventional semiconductor light-receiving device with the buried optical fiber, which has been taken along the line I—I of FIG. 14.

FIG. 2 is a graph showing for comparison the result of examining conduction at the respective electrodes of the semiconductor light-receiving devices according to the present embodiment shown in FIG. 1 and of the conventional semiconductor light-receiving devices shown in FIG. 14 after allowing them to stand under high-temperature conditions. In FIG. 2, the horizontal axis indicates ambient temperature and the vertical axis indicates the rate of conducting samples. The hollow circles on the graph indicate the conventional devices, while the solid circles indicate the devices according to the present embodiment. As shown in FIG. 2, 100 samples were prepared for each of the conventional device and the device according to the present embodiment and examined for conduction, while ambient temperature was varied from room temperature to 18020 C. In the conventional samples, the electrodes of the majority of modules became nonconducting when the ambient temperature reached 100° C. and all the samples suffered faulty conduction when the ambient temperature reached 180° C. By contrast, all the samples according to the present embodiment were excellently conducting even when they were allowed to stand at an ambient temperature of 180° C.

As stated previously, the UV curable resin material 13 for integrally fixing the substrate 11, the optical fiber 12, and the photodiode 16 expands under high-temperature conditions so that faulty connections are likely to occur in the MBB process which achieves connections by balancing the repulsive force of the bumps 15 made of gold and the contractive force of the UV curable resin material 13. This is because the bonding state in the resin material generally changes when the glass transition temperature Tg is exceeded, which causes a significant change in the volume of the resin material. For example, a lead-tin eutectic solder material used in connecting the bumps 15 to the photodiode 16 has a melting point of 183° C. The device cannot be assembled by a reflow process unless it is allowed to stand under high-temperature conditions.

However, since the semiconductor light-receiving device according to the present embodiment has the holders having a projecting portion to be fitted into the optical fiber groove 11a and extending over the optical fiber groove 11a to hold the both edge portions of the substrate 11 located on both sides of the optical fiber groove 11a, a variation in the width of the optical fiber groove 11a due to a variation in ambient temperature is suppressed, which prevents the bumps 15 from being disconnected from the electrode terminals and brought into the nonconducting state.

A description will be given to a method of manufacturing the semiconductor light-receiving device thus constituted.

Initially, the patterned electrodes 14 are formed from a conductive film on the photodiode mount regions of the main surface of the substrate 11 made of glass and having, e.g., a square configuration. Then, the plurality of bumps 15 made of gold are formed on the patterned electrodes 14 to correspond to the p-side and n-side electrode terminals made of gold and formed on the light-receiving surface of the photodiode 16.

Next, the optical fiber groove 11a is formed in the main surface of the substrate 11 to extend longitudinally from one end of the substrate 11 to the other end thereof between the bumps 15. Subsequently, the optical fiber 12 forming a transmission line for signal light is buried in the optical fiber groove 11a and the UV curable resin material 13 transparent at the wavelength of signal light propagated through the optical fiber 12 and having a refractive index substantially the same as that of the optical fiber 12 is filled in the gap between the optical fiber groove 11a and the optical fiber 12 to cover the top surface of the optical fiber 12.

Next, the pair of holders 18 each made of quartz glass having a linear expansion coefficient lower than that of the UV curable resin material 13 are disposed in the respective both end portions of the substrate 11 orthogonally to the optical axis of the optical fiber 12 with the respective projecting portions thereof being fitted into the upper portion of the optical fiber groove 11a, thereby extending over the optical fiber groove 11a and holding the both edge portions of the substrate 11 located on both sides of the optical fiber groove 11a. The holders 18 are then fixed thereto by using a resin adhesive or solder material.

Next, an optical-fiber intercepting groove is formed in the region of the main surface of the substrate 11 adjacent to the patterned electrodes 14 by means of a dicing machine or the like to be orthogonal to the optical axis. The optical-fiber intercepting groove intersects the optical fiber 12 at such an angle as to reflect signal light propagated through the optical fiber 12 under the photodiode 16 and to irradiate the light-receiving portion of the photodiode 16 with the reflected signal light. Subsequently, the mirror 17 for reflecting or diffracting light is buried in the optical-fiber intercepting groove. If it is sufficient to only reflect the signal light, a metal film may be formed by vapor deposition on one of the end faces of the optical fiber 12.

Next, the p-side and n-side electrode terminals on the light-receiving surface of the photodiode 16 are brought into contact with the corresponding bumps 15 on the patterned electrodes 14. Then, the UV curable resin material 13 is filled in the gap between the light-receiving surface of the photodiode 16 and the main surface of the substrate 11 and cured under the radiation of UV light to fix the photodiode 16 to the substrate 11.

Thus, because of the resin material used as a material for fixing the optical fiber 12 and the photodiode 16 to the substrate 11, the present embodiment cannot essentially prevent the development of stress due to the linear expansion coefficient of the resin material much higher than the linear expansion coefficients of the other components. However, since the device according to the present embodiment has the holders 18 for holding the width of the optical fiber groove 11a, a variation in the width of the groove 11a is suppressed even when ambient temperature is as high as 200° C., though the resin material softens and expands, so that the conducting property of the photodiode 16 is maintained excellently. Although the resin material expands not only along the main surface of the substrate 11 but in the vertical direction, it presents no problem since electrical connections are held in the vertical direction under the contractive force of the resin material and the restoring force of the bumps 15.

Thus, the semiconductor light-receiving device with the buried optical fiber can provide improved long-term reliability though it has a comparatively simple structure.

Although the present embodiment has used quartz glass having a linear expansion coefficient close to that of the substrate 11 to compose the holders 18, if a compound semiconductor having a linear expansion coefficient substantially the same as that of the photodiode 16 is used instead of quartz glass to compose the holders 18, not only a variation in the width of the optical fiber groove 11a due to the contraction or expansion of the resin material but also a variation in the width of the optical fiber groove 11a due to the contraction or expansion of the photodiode 16 can be suppressed.

Although the present embodiment has used the mirror 17 as the optical member for reflecting or diffracting the signal light propagated through the optical fiber 12, a translucent filter composed of a dielectric multilayer film may also be used instead. With the translucent filter, a bidirectional optical semiconductor device can easily be implemented by connecting a light-emitting element to the end of the optical fiber 12 closer to the optical member.

EMBODIMENT 2

A second embodiment of the present invention will be described with reference to the drawings.

Figure 3A:
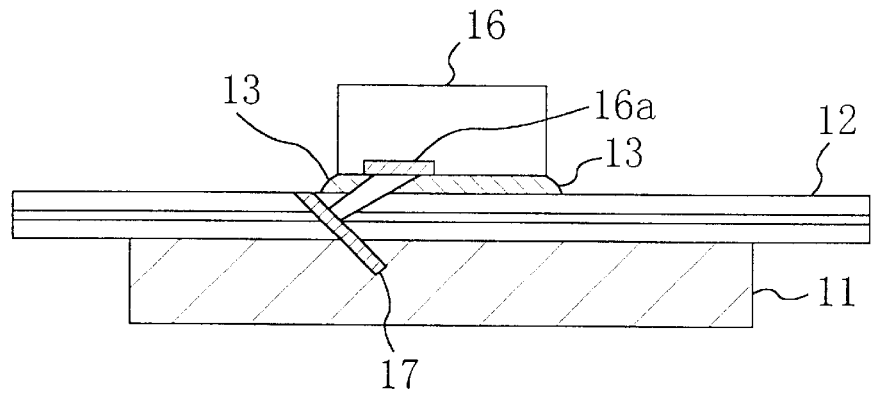
FIG. 3(a) is a structural cross-sectional view showing the direction of the optical axis of an optical fiber in a semiconductor light-receiving device with a buried optical fiber according to a second embodiment of the present invention.

FIG. 3(a) shows the cross-sectional structure of a semiconductor light-emitting device with a buried optical fiber according to the second embodiment, which has been taken along the optical axis of the optical fiber. The description of the same components as shown in FIGS. 1 and 3(a) will be omitted by assigning the same reference numerals thereto.

As described above, since the semiconductor light-receiving device with the buried optical fiber uses the large amount of resin material between the optical fiber groove formed in the substrate 11 and the optical fiber 12 and between the main surface of the substrate 11 and the light-receiving surface of the photodiode 16, the substrate is deformed by the stress of the resin material having a linear expansion coefficient higher than those of the substrate, the semiconductor, and the like. As a result, the bumps formed on the substrate 11 are more likely to be disconnected from the electrode terminals formed on the light-receiving surface of the photodiode 16, resulting in faulty conduction.

As shown in FIG. 3(a), the present embodiment has such a structure that the light-receiving portion 16a of the photodiode 16 is offset from the center of the light-receiving surface toward the mirror 17 in the direction in which signal light is propagated. In the structure, the reflecting region of the mirror 17 for reflecting signal light and the light-receiving portion 16a of the photodiode 16 are brought in closer proximity. This allows the depth of the optical fiber groove formed in the substrate 11 to be approximately equal to the diameter of the optical fiber 12 and thereby reduces the amount of the UV curable resin material 13. Accordingly, it becomes possible to reduce the stress of the resin material caused by a variation in ambient temperature and prevent bump disconnections.

Figure 3B:
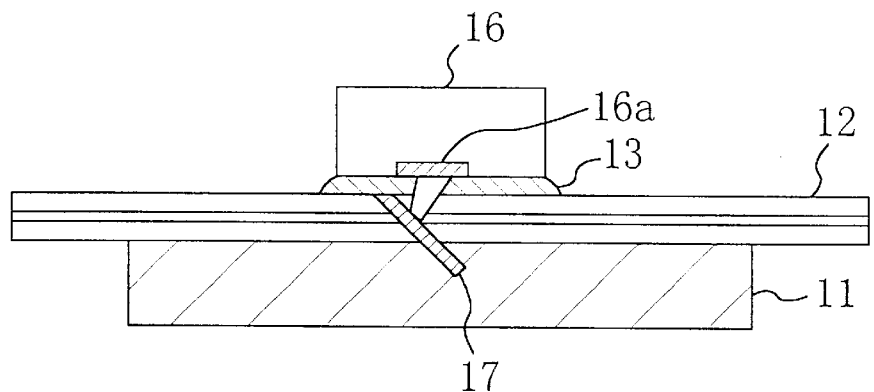
FIG. 3(b) is a structural cross-sectional view showing the direction of the optical axis of an optical fiber in a semiconductor light-receiving device with a buried optical fiber according to a variation of the second embodiment.

FIG. 3(b) shows a variation of the second embodiment. As shown in FIG. 3(b), if the mirror 17 is disposed in the substrate 11 to reflect signal light under the light-receiving portion 16a of the photodiode 16, the reflecting region of the mirror 17 for reflecting signal light and the light-receiving portion 16a of the photodiode 16 can be brought in closer proximity without changing the location of the receiving portion 16a of the photodiode 16. As a result, the amount of the UV curable resin material 13 to be filled in the gap between the main surface of the substrate 11 and the light-receiving surface of the photodiode 16 can be reduced accordingly.

To cancel out expansion and thermal distortion caused by the different linear expansion coefficients of the substrate 11 and the UV curable resin material 13 with maximum efficiency, it is adequate to fill the resin material in the whole gap between the main surface of the substrate 11 and the light-receiving surface of the photodiode 16 and to reduce the angle formed between the surface of the resin material and the main surface of the substrate 11 on the periphery of the photodiode 16.

Figure 3C:
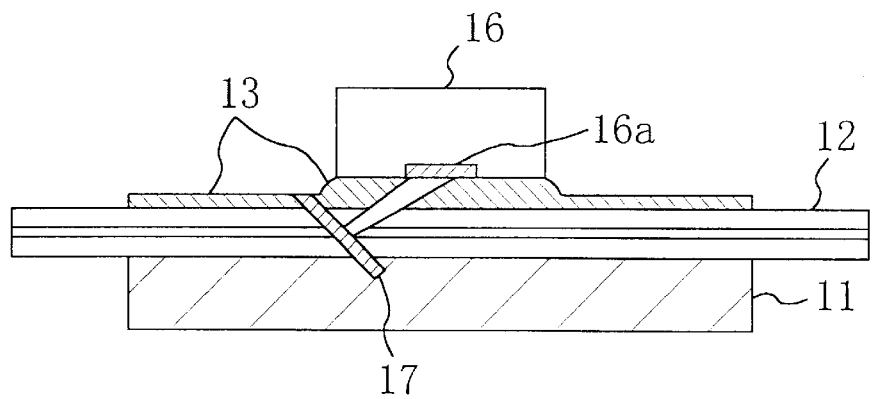
FIG. 3(c) is a structural cross-sectional view showing the direction of the optical axis of an optical fiber in the conventional semiconductor light-receiving device with the buried optical fiber.

FIG. 3(c) shows the cross-sectional structure of the conventional semiconductor light-receiving device with the buried optical fiber, which has been taken along the optical axis of the optical fiber. Since the light-receiving portion 16a of the photodiode 16 is formed at the center of the light-receiving surface, the depth of the optical fiber groove is larger than the diameter of the optical fiber 12, which increases the amount of the UV curable resin material 13.

EMBODIMENT 3

A third embodiment of the present invention will be described with reference to the drawings.

FIGS. 4(a) to 4(d) show the plan structure of a semiconductor light-receiving device with a buried optical fiber according to the third embodiment. Prior to the description of FIGS. 4(a) to 4(d), a variation in the width of the optical fiber groove 11a formed in the substrate 11 will be described with reference to FIG. 5.

Figure 5:
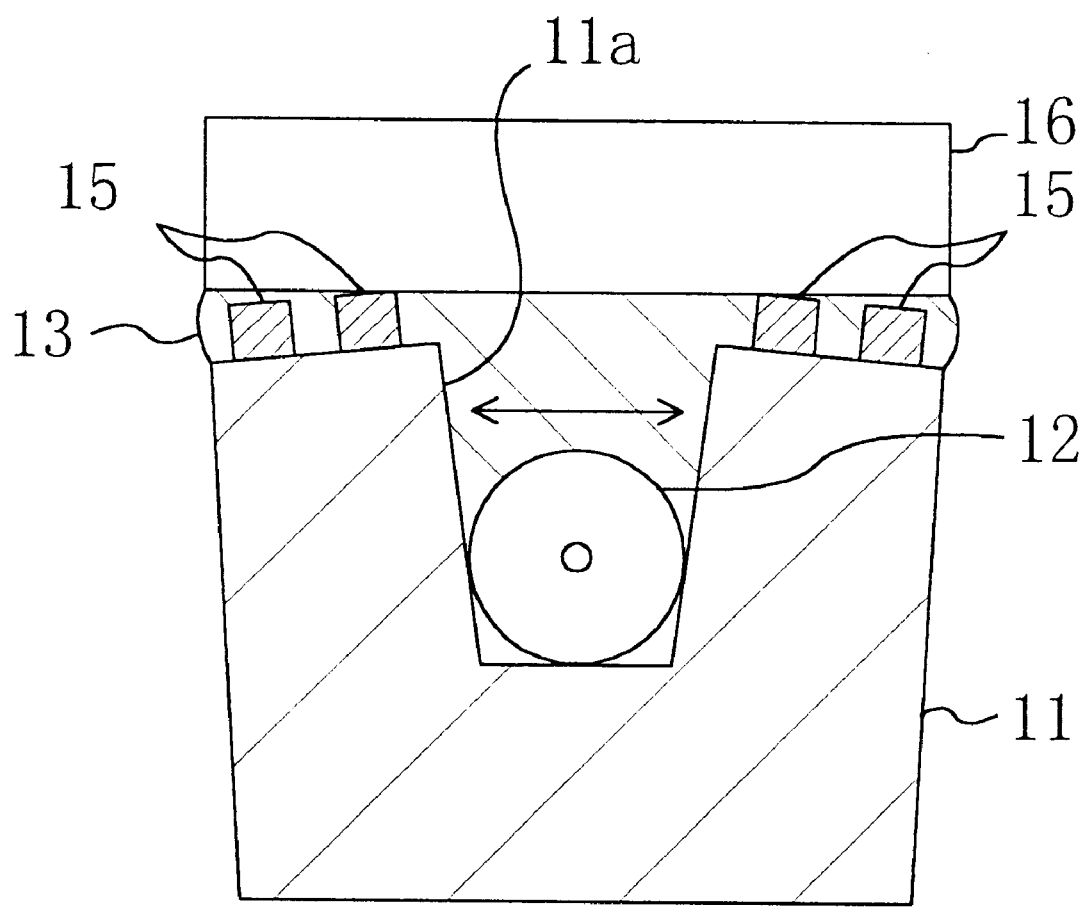
FIG. 5 is a structural cross-sectional view showing a direction vertical to the optical axis in the conventional semiconductor light-receiving device with the buried optical fiber.

FIG. 5 shows the cross-sectional structure of the semiconductor light-receiving device, which has been taken along the optical axis of the optical fiber. The description of the same components as shown in FIGS. 1 and 5 will be omitted by assigning the same reference numerals thereto.

Compared with the linear expansion coefficients of quartz and glass materials which are on the order of $10^{-6}$ to $10^{-5}$, the linear expansion coefficient of a typical resin material is as high as $10^{-4}$. Consequently, the optical fiber groove 11a formed in the substrate 11 expands or contracts not only in the direction vertical to the main surface of the substrate 11 but also in the direction parallel to the main surface due to a variation in ambient temperature. As shown in FIG. 5, since the substrate 11 receives a warping force exerted around an axis constituted by the portion of the back surface of substrate 11 underlying the center of the bottom of the optical fiber groove 11a and the bumps 15 are formed at different distances from the optical groove 11a on the main surface of the substrate 11, some of the bumps 15 formed closer to the both edges of the substrate 11 cannot keep contact with the photodiode 16. When the UV curable resin material 13 contracts, on the other hand, some of the bumps 15 formed closer to the center of the substrate 11 cannot keep contact with the photodiode 16, though they are not shown in the drawing.

The bumps 15 can be functionally subdivided into two types, which are conducting bumps for providing electrical connection between the photodiode 16 and the substrate 11 and support bumps for mechanically supporting the photodiode 16. If the bumps which cannot keep contact with the photodiode 16 due to a variation in ambient temperature are assumed to be the conducting bumps, the substrate 11 and the photodiode 16 are electrically disconnected from each other.

Figure 4A:
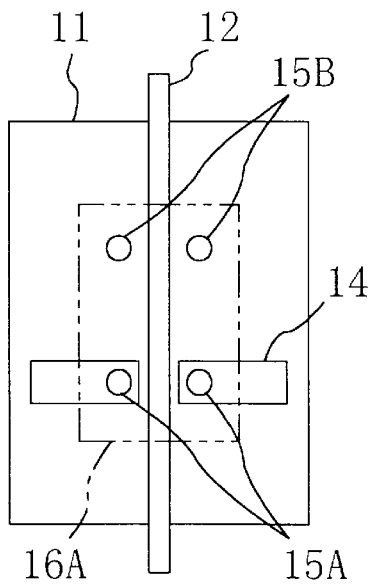
FIGS. 4(a) to 4(d) are plan views of a semiconductor light-receiving device with a buried optical fiber according to a third embodiment of the present invention.

In the present embodiment shown in FIG. 4(a), the optical fiber 12 is buried longitudinally in the main surface of the substrate 11 made of glass, while the patterned electrodes 14 for achieving electrical connection with the outside of the device are formed on the photodiode mount region 16A of the main surface of the substrate 11. The conducting bumps 15A are formed on the patterned electrodes 14, while the support bumps 15B are formed externally of the patterned electrodes 14. The arrangement of the bumps 15A and 15B is characterized in that, if a pair of conducting bumps 15A for the p-side and n-side electrode terminals are disposed in opposing relation with intervention of the optical fiber groove, the support bumps 15B are disposed along the side faces of the optical fiber groove to be parallel with the conducting bumps 15A.

Even when the bumps 15A and the bumps 15B are brought closer to or away from each other around the axis constituted by the portion of the back surface of the substrate 11 underlying the center of the bottom of the optical fiber groove, the arrangement prevents any of the plurality of bumps 15A and 15B from suffering a faulty connection alone, since the bumps 15A and 15B are equidistant from the optical fiber groove in each of the regions of the main surface of the substrate 11 located on both sides of the optical fiber groove.

It is also possible to use any one of the support bumps 15B shown in FIG. 4(a) alone or position the patterned electrodes 14 diagonally in the photodiode mount region 16a and dispose the pair of conducting bumps 15A on the patterned electrodes in (diagonal positions.

Figure 4B:
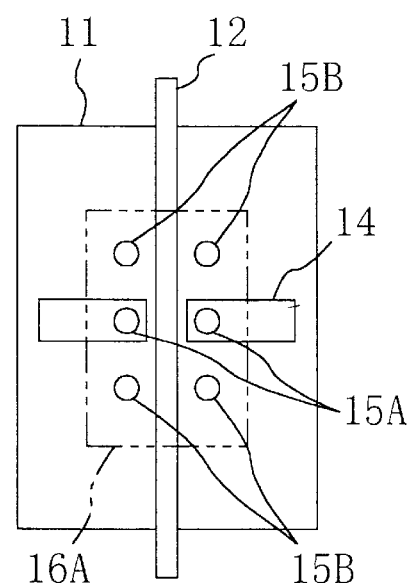

In contrast to FIG. 4 (a) showing a minimum structure with three of four bumps, six bumps are provided in the structure shown in FIG. 4(b) to achieve more stable fixation of the photodiode to the substrate 11. Although the pair of conducting bumps 15A and the patterned electrodes 14 are in opposing relation with intervention of the optical fiber 12 in FIG. 4(b), they may also be disposed in oblique relation, not in opposing relation, with intervention of the optical fiber 12. The conducting bumps 15A and the patterned electrodes may also be positioned on the end portions of the rows of bumps. In that case also, the bumps 15A and 15B are alternately placed in two rows extending parallel to each other along the respective side faces of the optical fiber groove. It is to be noted that the bumps in one row and the bumps in the other row need not necessarily be equidistant from the optical fiber groove. This is because, if the bumps in one of the rows are equidistant from the optical fiber groove, the upper end portions of the respective bumps draw an arc locus when the bumps are disconnected from the electrode terminals of the photodiode so that the vertical component of the locus (direction vertical to the main surface of the substrate 11) becomes equal for each of the bumps, which allows the upper end portions of the individual bumps to make uniformly close contacts with the corresponding electrode terminals.

Figure 4C:
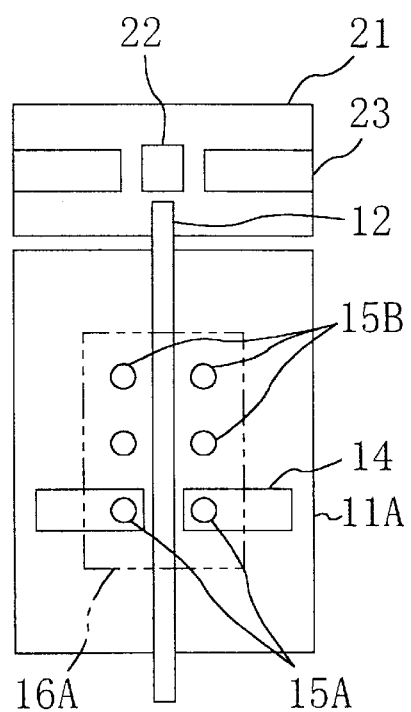
Figure 4D:
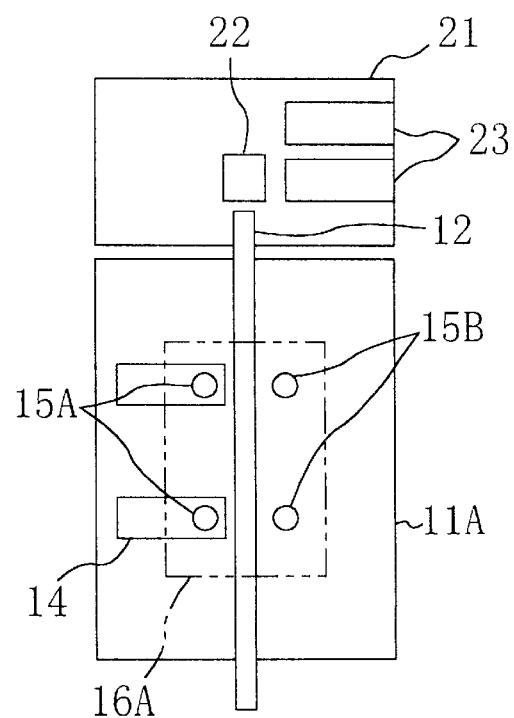

As shown in FIG. 4(c), a second substrate 21 is disposed adjacent to the first substrate 11A to face one end of the optical fiber 12. A light-emitting element 22 optically connected to one end of the optical fiber 12 is disposed on the second substrate 21, while patterned electrodes 23 are also formed thereon. In this case, the conducting bumps 15A in the two rows are adequately positioned furthest from the light-emitting element 22 to prevent electrical interference of respective signals generated from the light-emitting element 22 and from the photodiode.

Alternatively, if the patterned electrodes 23 for the light-emitting element and the patterned electrodes 14 for the photodiode are disposed on the respective main surfaces of the first and second substrates 11A and 22 to be in opposite regions relative to the optical fiber 12, wires for the photodiode to be connected to the conducting bumps 15A and wires for the light-emitting element to be connected to the patterned electrodes are no more in close proximity, so that the electrical interference of the signals due to the wires in close proximity is prevented.

A description will be given to variations of the third embodiment with reference to the drawings.

Figure 6A:
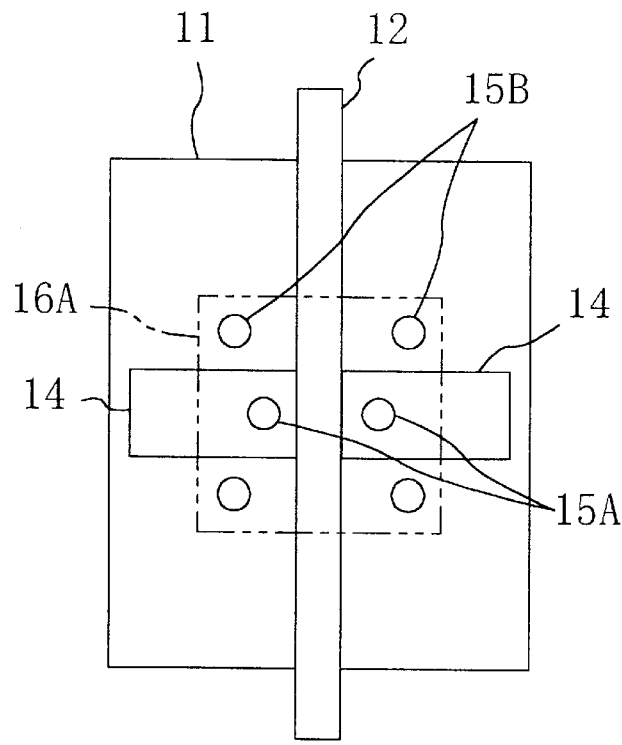
FIG. 6(a) is a plan view of a semiconductor light-receiving device with a buried optical fiber according to a first variation of the third embodiment.

FIG. 6(a) shows the plan structure of a semiconductor light-receiving device with a buried optical fiber according to the first variation of the third embodiment. The description of the same components as shown in FIGS. 3(a) and 6(a) will be omitted by assigning the same reference numerals thereto. In the first variation, the conducting bumps 15A in opposing relation to each other are positioned at smaller distances from the side faces of the optical fiber groove than the support bumps 15B.

If the semiconductor light-receiving device operates at a comparatively high ambient temperature, the resin material for fixing the optical fiber 12 to the substrate 11 steadily expands, so that the width of the optical fiber groove becomes larger than in the manufacturing process. If the conducting bumps 15A are preliminarily positioned at smaller distances from the side faces of the optical fiber groove, the bumps are prevented from being greatly displaced from the predetermined positions, which ensures conduction. Moreover, since the rows of bumps have nonlinear configurations, the photodiode 16 in the manufacturing process gains sufficient strength against the pressure exerted thereon during bonding.

Figure 6B:
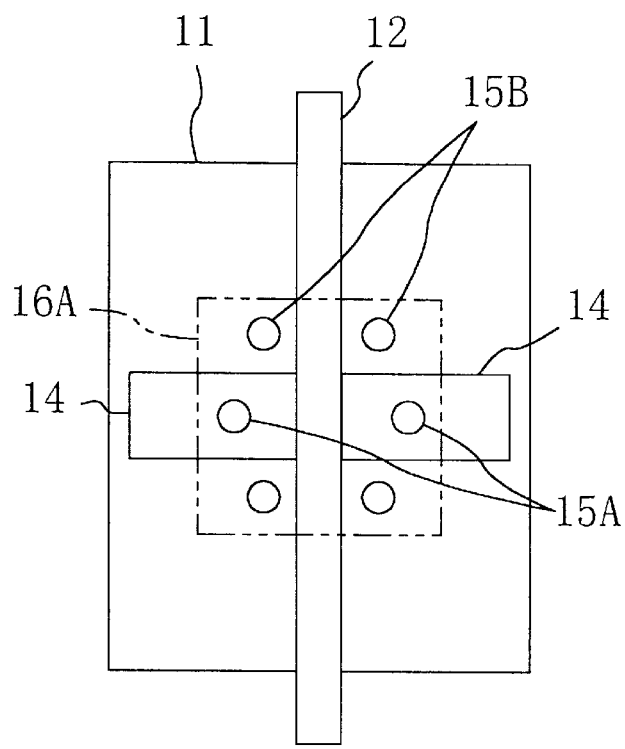
FIG. 6(b) is a plan view of a semiconductor light-receiving device with a buried optical fiber according to a second variation of the third embodiment.

FIG. 6(b) shows a second variation of the third embodiment, in which the conducting bumps 15A in opposing relation to each other are preliminarily positioned at greater distances from the side faces of the optical fiber groove than the support bumps 15B.

If the semiconductor light-receiving device operates at a comparatively low ambient temperature, the resin material for fixing the optical fiber 12 to the substrate 11 steadily contracts, so that the width of the optical fiber groove becomes smaller than in the manufacturing process. If the conducting bumps 15A are positioned at greater distances from the side faces of the optical fiber groove, the bumps are prevented from being greatly displaced from the predetermined positions, which ensures conduction. Moreover, since the rows of bumps have nonlinear configurations, the photodiode 16 in the manufacturing process gains sufficient strength against the pressure exerted thereon during bonding.

Although each of the bumps 15A and 15B has a cylindrical configuration, even a single pair of bumps can be used as conducting bumps as well as supporting bumps if each of the bumps has a square or oval cross section taken along the main surface of the substrate, which linearly supports the two pairs of opposed edges of the photodiode at indiscrete points, not at discrete points.

EMBODIMENT 4

A fourth embodiment of the present invention will be described with reference to the drawings.

Figure 7A:
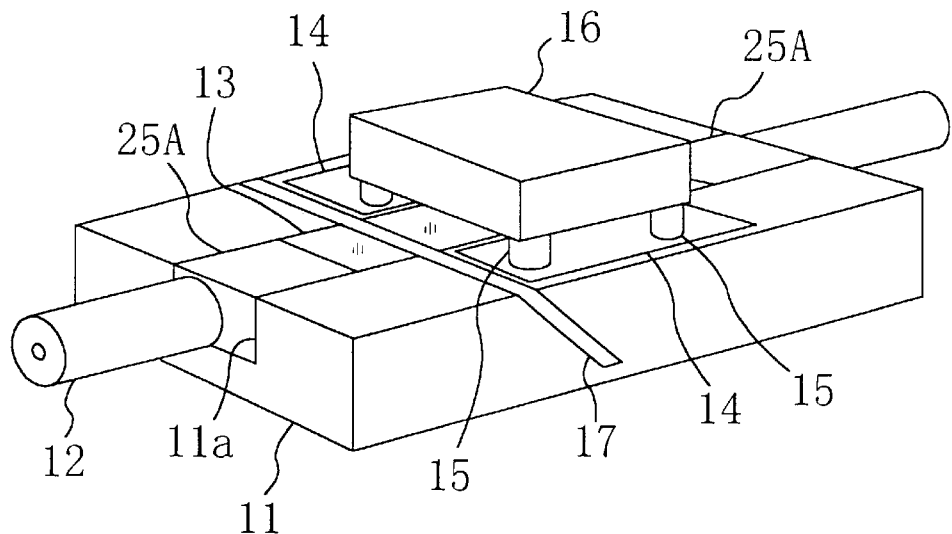
FIGS. 7(a) and 7(b) are perspective views of a semiconductor light-receiving device with a buried optical fiber according to a fourth embodiment of the present invention.
Figure 7B:
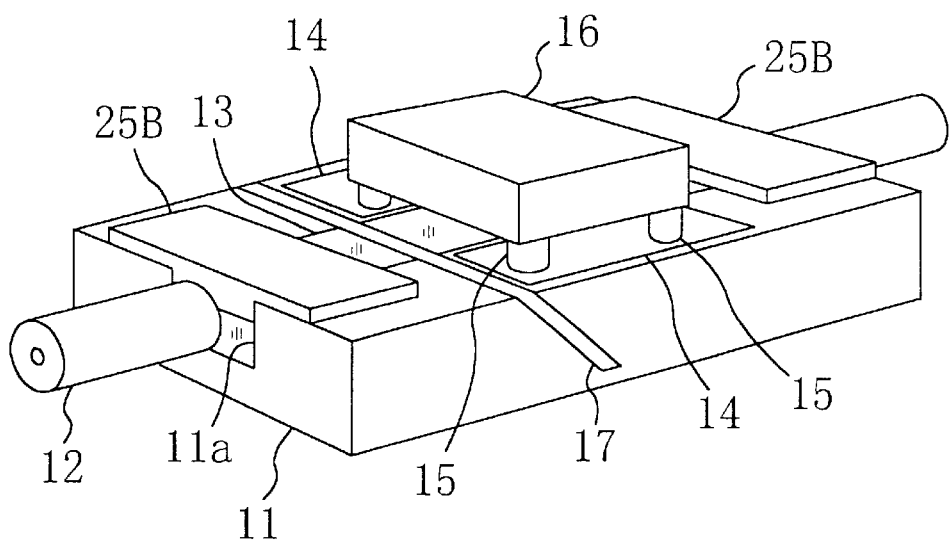

FIGS. 7(a) and 7(b) are perspective views of a semiconductor light-receiving device with a buried optical fiber according to the fourth embodiment. The description of the same components as shown in FIGS. 1, 7(a), and 7(b) will be omitted by assigning the same reference numerals thereto. As shown in FIG. 7(a), fixing members 25A are filled in the both end portions of the optical fiber groove 11a formed in the substrate 11 along the optical axis.

In the semiconductor light-receiving device with the buried optical fiber, the optical fiber 12 is fixed in the optical fiber groove 11a formed in the substrate 11 by using the UV curable resin material 13. The resin material has the general property of softening when the glass transition temperature Tg is exceeded and hardening again when the temperature thereof is lowered to the glass transition temperature Tg or under as a result of a re-cooling process.

In the present embodiment, even when ambient temperature is increased with external pressure exerted on the optical fiber 12 to soften the UV curable resin material 13, the fixing members 25A prevent the optical fiber 12 from changing positions. Consequently, there is no possibility of troubled receiving operation since the optical fiber 12 is prevented from changing positions and a constant distance is held between the mirror 17 and the light-receiving surface of the photodiode 16 for receiving signal light propagated through the optical fiber 12 and reflected by the mirror 17, resulting in a uniform quantity of signal light incident on the light-receiving surface of the photodiode 16.

A description will be given to the characteristic method of manufacturing the semiconductor light-receiving device according to the present embodiment.

Initially, the patterned electrodes 14 is formed from a conductive film on the photodiode mount portion of the main surface of the substrate 11, similarly to the first embodiment. Then, the plurality of bumps 15 made of gold are formed on the respective patterned electrodes 14 to correspond to the p-side and n-side electrode terminals made of gold and formed on the light-receiving surface of the photodiode 16.

Next, the optical fiber groove 11a is formed in the main surface of the substrate 11 to extend from one end of the substrate 11 to the other end thereof between the bumps 15. Subsequently, the optical fiber 12 forming a transmission line for signal light is buried in the optical fiber groove 11a.

Next, the inner surfaces of the both end portions of the optical fiber groove 11a formed in the substrate 11 and the side surface of the optical fiber 12 in opposing relation to the inner faces are metallized to achieve excellent adhesion to the solder material. Thereafter, the solder material is filled in the gaps between the optical fiber 12 and the both end portions of the optical fiber groove 11a formed in the substrate 11 to cover the top surface of the optical fiber 12, thereby forming the fixing members 25A.

Next, the UV curable resin material 13 transparent at the wavelength of signal light propagated through the optical fiber 12 and having a refractive index substantially the same as that of the optical fiber 12 is filled in the gap between the optical fiber 12 and the portion of the optical fiber groove 11a interposed between the fixing members 25A to cover the top surface of the optical fiber 12.

Thereafter, the photodiode 16 is fixed to the predetermined position of the main surface of the substrate 11 and the mirror 17 is disposed.

Instead of using the solder material, fixing members 25B each made of a glass material or the like may also be disposed in the both end portions of the optical fiber groove 11a to fix the optical fiber 12. In the arrangement, the substrate 11 and the fixing members 25B equally expand or contract because the substrate 11 and the fixing members 25B have the same linear expansion coefficient, so that the main surface of the substrate 11 is prevented from warping. This maintains a uniform distance between the core portion of the optical fiber 12 and the light-receiving portion of the photodiode 16 and further improves reliability against a variation in ambient temperature during receiving operation.

EMBODIMENT 5

A fifth embodiment of the present invention will be described with reference to the drawings.

Figure 8A:
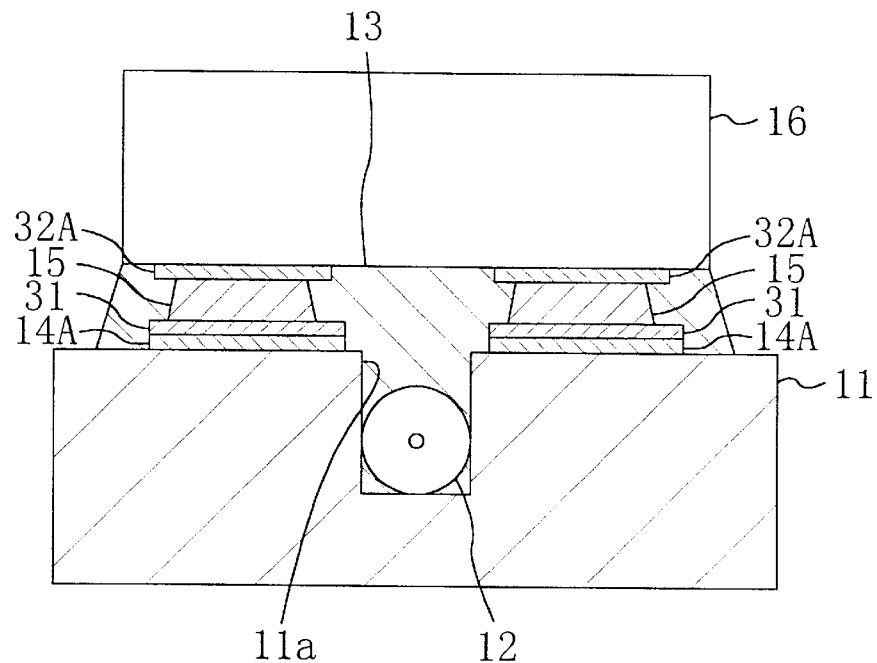
FIG. 8(a) is a structural cross-sectional view showing a direction vertical to an optical axis in a semiconductor light-receiving device with a buried optical fiber according to a fifth embodiment of the present invention.

FIG. 8(a) shows the cross-sectional structure of a semiconductor light-receiving device with a buried optical fiber according to the fifth embodiment, which has been taken vertically to the optical axis of the optical fiber. The description of the same components as shown in FIGS. 1 and 8(a) will be omitted by assigning the same reference numerals thereto. As shown in FIG. 8(a), metal layers 31 each composed of a thin film of nickel (Ni)and having a thickness of 0.5 $\mu$m are interposed between the bumps 15 each made of a lead-tin eutectic solder material and patterned electrodes 14A each made of gold and formed on the main surface of the substrate 11. On the other hand, electrode terminals 32A each made of, e.g., aluminum are formed on the light-receiving surface of the photodiode 16 to correspond to the individual bumps 15.

Figure 8B:
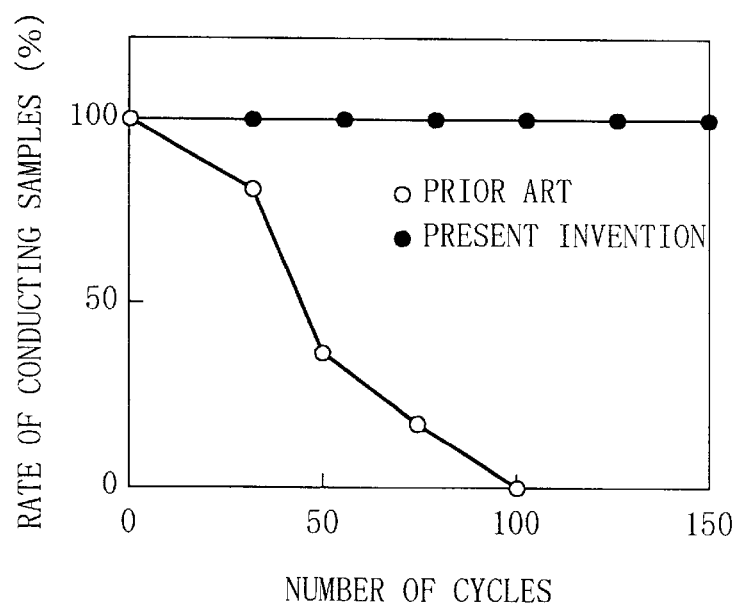
FIG. 8(b) is a graph showing the dependence of the rate of conducting samples on the number of cycles in a temperature cycle test performed on each of the devices according to the fifth embodiment and the conventional device.

FIG. 8(b) shows the result of a temperature cycle test performed with respect to the semiconductor light-receiving devices with the metal layers 31 and the semiconductor light-receiving devices without the metal layers 31, in which ambient temperature is periodically and repeatedly increased and decreased in the range of –40° C. to 70° C. In FIG. 8(b), the horizontal axis indicates the number of test cycles, the vertical axis indicates the rate of the number of conducting samples to the total number of samples, the hollow circles indicate the conventional devices, and the solid circles indicate the devices according to the present embodiment. As shown in FIG. 8(b), the electrodes of the majority of conventional samples became nonconducting when the number of test cycles exceeded 500 and all the samples suffered faulty conduction in the 100-th cycle. By contrast, the samples according to the present embodiment achieved 100% conductivity till the 150-th cycle.

In the conventional device, tin contained in the bumps 15 is diffused toward the patterned electrodes 14A under high-temperature conditions to form a gold-tin alloy lower in mechanical strength in combination with gold contained in the patterned electrodes 14A, as stated previously. If a variation in ambient temperature causes a thermal distortion in the formed gold-tin alloy, a crack occurs at the interface between the gold-tin alloy and gold or lead contained in the solder material. The crack develops with an increase in the number of test cycles involving temperature variations till an electrically nonconducting state is reached eventually.

By contrast, the device according to the present embodiment obviates faulty conduction with the provision of the metal layers 31 for preventing the diffusion of tin between the patterned electrodes 14A and the bumps 15 made of the lead-tin eutectic solder material excellent in workability.

Although the present embodiment has used the metal layers 31 of nickel, there may also be used metal thin films of platinum (P), titanium (T), or chromium (Cr). It is also possible to form a multilayer structure from any of the metal thin films or alloy the metal thin films.

Instead of the metal layers 31, a lead-tin eutectic solder material having the composition ratio of tin as low as 30% may also be used. In the case where the composition ratio of tin is on the order of 30%, the solder material is prevented from melting while being worked since the melting point of the solder material is as high as 270° C. Since only an extremely small amount of gold-tin alloy is produced, long-term reliability is improved.

Instead of the metal layers 31, a solder material containing indium as the main component thereof may also be used. Even when tin contained in the lead-tin eutectic solder material is diffused toward the patterned electrodes 14A, the arrangement prevents the growth of an indium-tin alloy because of the low growth rate thereof, so that faulty conduction is less likely to occur.

EMBODIMENT 6

A sixth embodiment of the present invention will be described with reference to the drawings.

Figure 9A:
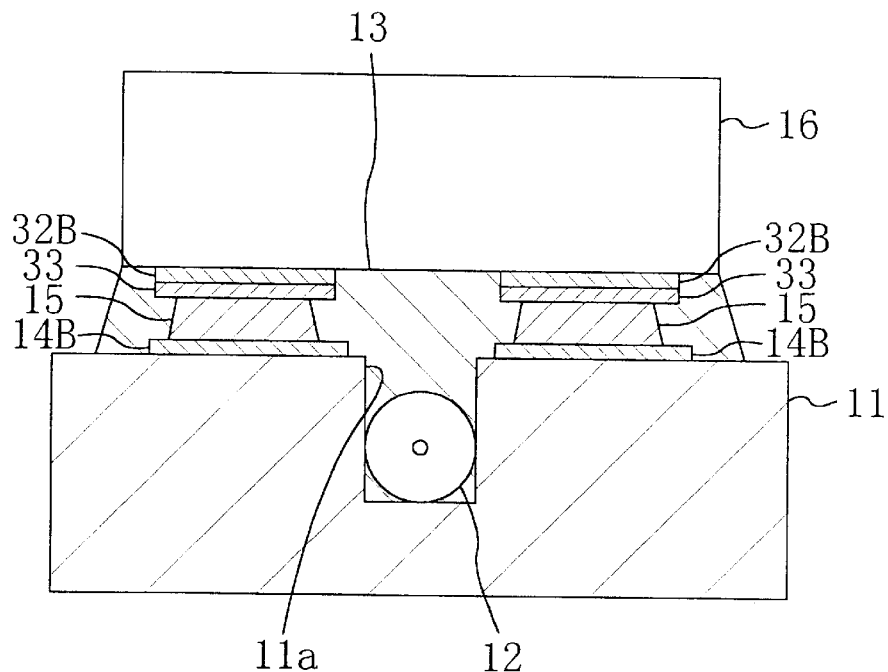
FIG. 9(a) is a structural cross-sectional view showing a direction vertical to an optical axis in a semiconductor light-receiving device with a buried optical fiber according to a sixth embodiment of the present invention.

FIG. 9(a) shows the cross-sectional structure of a semiconductor light-receiving device with a buried optical fiber according to the sixth embodiment, which has been taken vertically to the optical axis of the optical fiber. The description of the same components as shown in FIGS. 8(a) and 9(a) will be omitted by assigning the same reference numerals thereto. As shown in FIG. 9(a), patterned electrodes 14B each made of aluminum and the bumps 15 each made of the lead-tin eutectic solder material are formed on the main surface of the substrate 11. Metal layers 33 each composed of a metal thin film of nickel with a thickness of 0.5 $\mu$m is interposed between the bumps 15 and electric terminals 32B formed on the light-receiving surface of the photodiode 16.

Figure 9B:
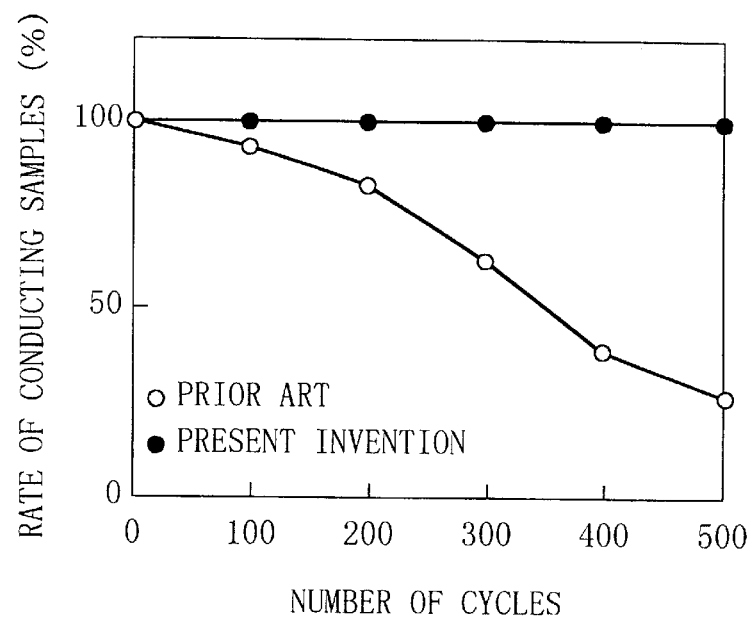
FIG. 9(b) is a graph showing the dependence of the rate of conducting samples on the number of cycles in a temperature cycle test performed on each of the devices according to the sixth embodiment and the conventional device.

FIG. 9(b) shows the result of a temperature cycle test performed with respect to the semiconductor light-receiving devices with the metal layers 33 and the semiconductor light-receiving devices without the metal layers 33, in which ambient temperature is periodically and repeatedly increased and decreased in the range of –40° C. to 70° C. In FIG. 9(b), the horizontal axis indicates the number of test cycles, the vertical axis indicates the rate of the number of conducting samples to the total number of samples, the hollow circles indicate the conventional devices, and the solid circles indicate the devices according to the present embodiment. As shown in FIG. 9(b), if a sample with light-receiving sensitivity reduced to 0.4 A/W or lower is judged to be faulty, the majority of conventional samples became faulty when the number of cycles exceeds 400. By contrast, the samples according to the present embodiment provided stable light-receiving sensitivity till the 500-th cycle.

In the conventional device, tin contained in the bumps 15 is diffused toward the electrode terminals 32 under high-temperature conditions to cause increased contact resistance and degraded light-receiving sensitivity due to the masking of the light-receiving surface. If thermal distortion is further caused by a variation in ambient temperature, the degradation proceeds till an electrically non-conductive state is reached eventually.

By contrast, the device according to the present embodiment prevents degraded light-receiving sensitivity and faulty conduction due to the lead-tin eutectic solder material with the provision of the metal layers 33 for preventing the diffusion of tin between the electrode terminals 32B and the bumps 15 made of the lead-tin eutectic solder material excellent in workability.

Although the present embodiment has used the metal layers 33 of nickel, there may also be used metal thin films of platinum, titanium, or chromium. It is also possible to form a multilayer structure from any of the metal thin films or alloy the metal thin films.

Instead of the metal layers 33, a lead-tin eutectic solder material having the composition ratio of tin as low as 30% may also be used. In the case where the composition ratio of tin is on the order of 30%, the solder material is prevented from melting while being worked since the melting point of the solder material is as high as 270° C. Since only an extremely small amount of gold-tin alloy is produced, long-term reliability is improved.

Instead of the metal layers 33, a solder material containing indium as the main component thereof may also be used. Even when tin contained in the lead-tin eutectic solder material is diffused toward the electrode terminals 32B, the arrangement prevents the growth of an indium-tin alloy because of the low growth rate thereof, so that the degradation of the electrode terminal 32B is suppressed.

EMBODIMENT 7

A seventh embodiment of the present invention will be described with reference to the drawings.

Figure 10A:
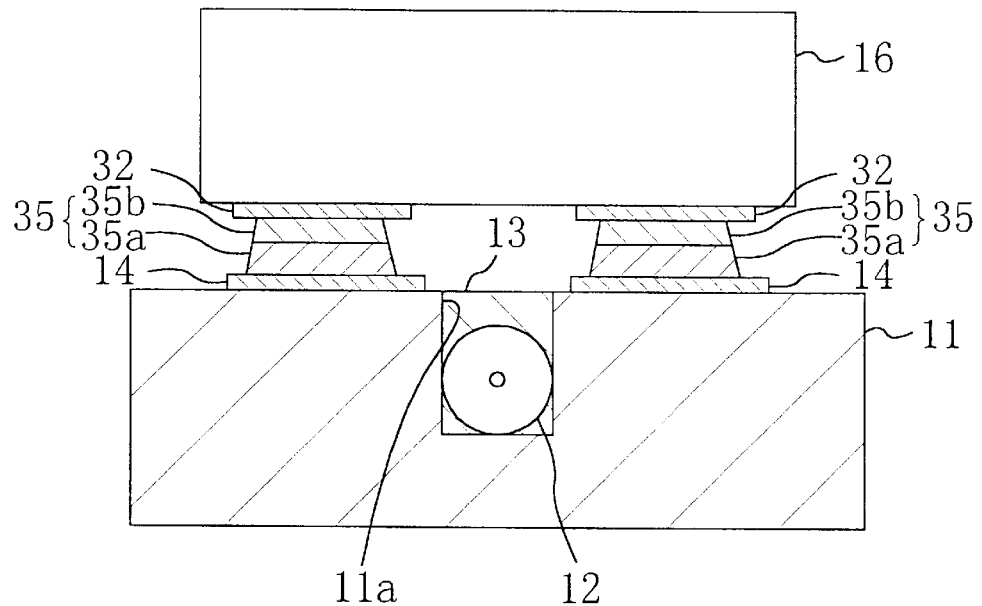
FIGS. 10(a) and 10(b) a re structural cross-sectional views each showing a direction vertical to an optical axis in a semiconductor light-receiving device with a buried optical fiber according to a seventh embodiment of the present invention.
Figure 10B:
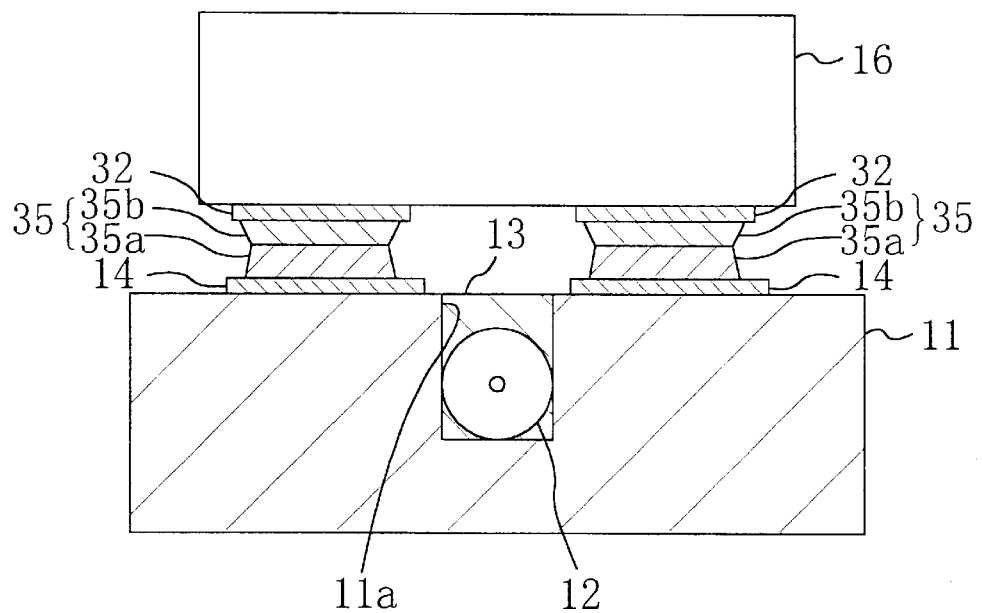

FIG. 10(a) shows the cross-sectional structure of a semiconductor light-receiving device with a buried optical fiber according to the seventh embodiment, which has been taken vertically to the optical axis of the optical fiber. The description of the same components as shown in FIGS. 9(a) and 10(a) will be omitted by assigning the same reference numerals thereto. As shown in FIG. 10(a), bumps 35 each consisting of a lower bump 35a made of gold and an upper bump 35b made of a lead-tin eutectic solder material are formed on the patterned electrodes 14 each composed of a conductive film formed on the main surface of the substrate 11. The bumps 35 are connected to the corresponding electrode terminals 32 formed on the light-receiving surface of the photodiode 16. The cross-sectional structure shown in FIG. 10(a) is at a manufacturing stage prior to the filling of the UV curable resin material in the gap between the main surface of the substrate 11 and the light-receiving surface of the photodiode 16.

In the arrangement, the amount of the solder material used in the bumps 35 is reduced so that there is no more possibility that the solder material used in the process of fixing the bumps 35 to the electrode terminals 32 of the photodiode 16 is melted to cause a short circuit between the electrode terminals 32 or between the patterned electrodes 14, resulting in improved yield during manufacturing.

Figure 11A:
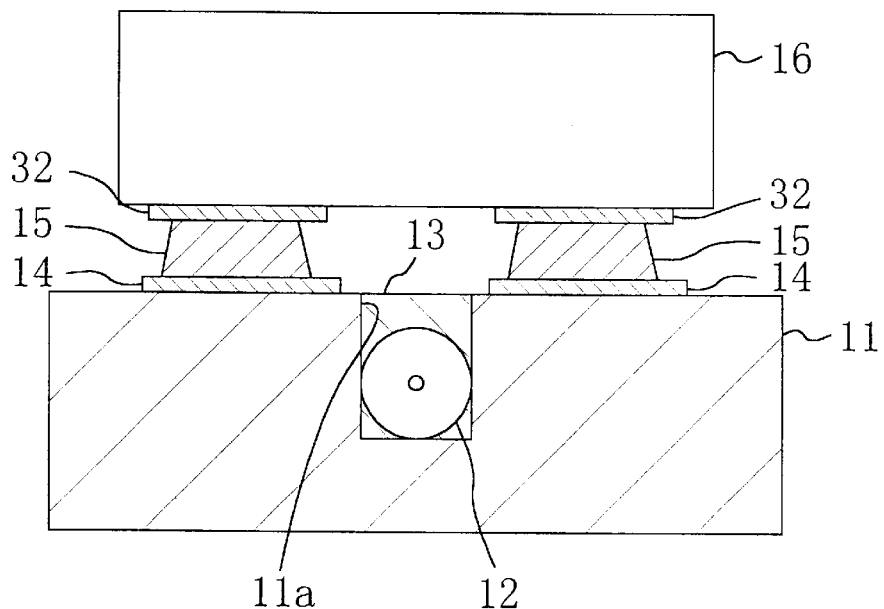
FIGS. 11(a) and 11(b) are structural cross-sectional views each showing a direction vertical to the optical axis in the conventional semiconductor light-receiving device with t he buried optical fiber.
Figure 11B:
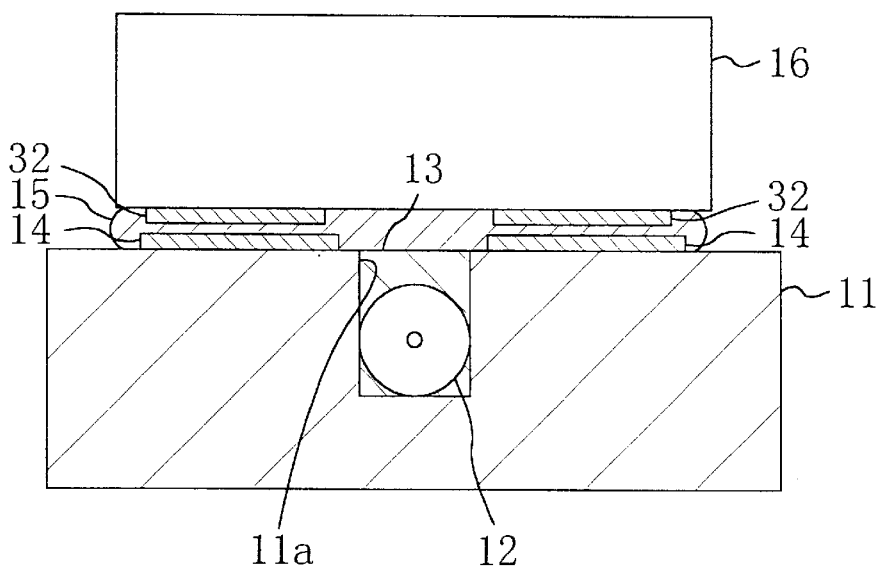

If the bumps 15 are formed only from the lead-tin eutectic material as shown in FIG. 11(a), the molten solder material may cause a short circuit between the electrode terminals 32 or between the patterned electrodes 14 as shown in FIG. 11(b).

EMBODIMENT 8

An eighth embodiment according to the present invention will be described with reference to the drawings.

Figure 12:
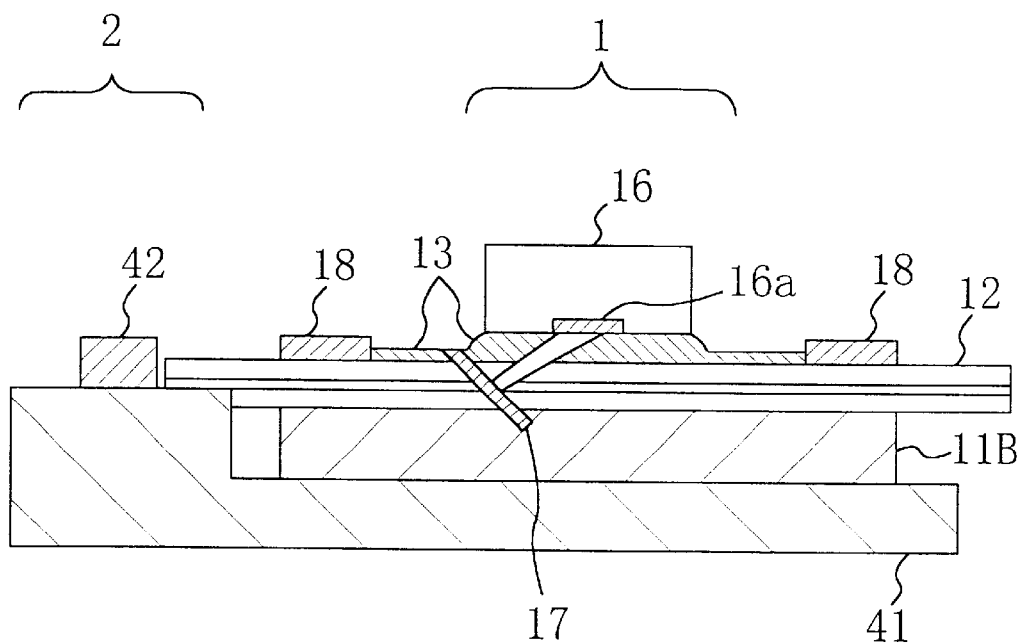
FIG. 12 is a structural cross-sectional view showing the direction of an optical axis in a bidirectional optical semiconductor device according to an eighth embodiment of the present invention.

FIG. 12 shows the cross-sectional structure of a bidirectional optical semiconductor device according to the eighth embodiment, which has been taken along the optical axis of an optical fiber used therein. As shown in FIG. 12, the bidirectional optical semiconductor device is composed of silicon and has a light receiver portion 1 formed on the lower-stage portion of a first substrate 41 having a stepped configuration and a light emitter portion 2 formed on the upper-stage portion of the first substrate 41.

The light receiver portion 1 has the same structure as the first embodiment, wherein a groove into which an optical fiber 12 as a transmission line is buried is formed in the main surface of a second substrate 11B made of glass. The optical fiber 12 is buried in the optical fiber groove with a UV curable resin material 13 filled in the gap between the optical fiber 12 and the optical fiber groove. A photodiode 16 has been fixed to the main surface of the second substrate 11B such that p-side and n-side electrode terminals formed on the light-receiving surface thereof are in contact with and electrically connected to the corresponding bumps. A mirror 17 is also disposed in the main surface of the second substrate 11B to reflect signal light propagated through the optical fiber 12 under the photodiode 16 and irradiate the light-receiving portion 16a of the photodiode 16 with the reflected signal light. The mirror 17 used in the present embodiment is translucent so as not to interrupt the signal light from the light emitter portion 2. A pair of holders 18 each made of quartz glass having a linear expansion coefficient lower than that of the UV curable resin material 13 are disposed in the respective both end portions of the second substrate 11B orthogonally to the optical axis of the optical fiber 12. Each of the holders 18 has a projecting portion to be fitted into the upper portion of the optical fiber groove 11a and extends over the optical fiber groove 11a to hold the both edge portions of the substrate 11 located on both sides of the optical fiber groove 11a.

The light emitter portion 2 is composed of a semiconductor laser element 42 emitting light at a wavelength of 1.3 $\mu$m which has been fixed onto the first substrate 41 by using the solder material and coupled directly to the end of the optical fiber 12 located on the opposite side of the photodiode 16 relative to the mirror 17. The riser portion of the first substrate 41 is formed with a groove having a V-shaped cross section which allows so-called passive alignment in the manufacturing process, whereby the optical fiber 12 is aligned with respect to the active layer of the semiconductor laser element 42 based only on working accuracy for the components if only the end portion of the optical fiber 12 is inserted in the V-shaped groove.

Since the holders 18 for suppressing a variation in the width of the optical fiber groove due to a temperature variation are thus provided in the semiconductor light-receiving device with the buried optical fiber using a large amount of resin material in the light receiver portion 1, the bumps for providing electrical connection between the second substrate 11B and the photodiode 16 suffer no faulty conduction. This provides long-term reliability with the use of comparatively simple components.

Since the light emitter portion 2 is manufactured by simple passive alignment and reliably integrated with the light receiver portion 1 to facilitate signal transmission and reception, there can be implemented a high-performance bidirectional optical semiconductor device reduced in size.

Although the present embodiment has described the bidirectional optical semiconductor device emitting light at a wavelength of 1.3 $\mu$m by way of example, similar effects can be achieved if a bidirectional optical semiconductor device emitting light at a wavelength of 1.5 $\mu$m or a wavelength multiplexing system for performing signal transmission and reception at wavelengths of 1.3 $\mu$m and 1.5 $\mu$m is used instead.

Although the present embodiment has used the semiconductor light-receiving device according to the first embodiment as the light emitter portion 2, it is not limited thereto. The light emitter portion 2 may be any of the semiconductor light-receiving devices according to the second to seventh embodiments and the variations thereof or, alternatively, the foregoing semiconductor light-receiving devices may be combined properly to compose the light emitter portion 2.

EMBODIMENT 9

A ninth embodiment of the present invention will be described with reference to the drawings.

Figure 13:
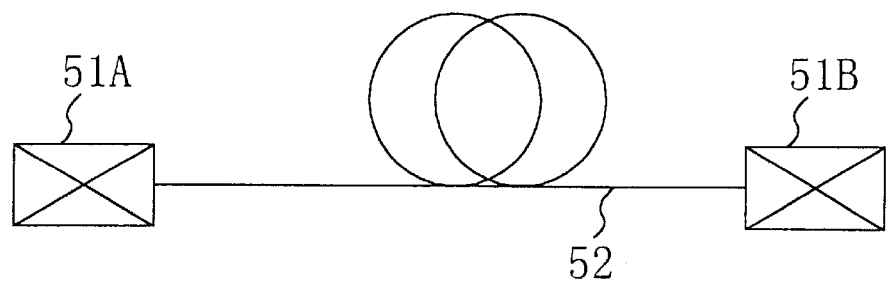
FIG. 13 is a structural view of a bidirectional optical transmission system according to a ninth embodiment of the present invention.

FIG. 13 shows the structure of a bidirectional optical transmission system according to the ninth embodiment. As shown in the drawing, a first bidirectional optical semiconductor device 51A and a second bidirectional optical semiconductor device 51B are connected to each other by a transmission line 52 using a single-mode optical fiber with a length of 10 km.

Each of the first and second bidirectional optical semiconductor devices 51A and 51B is composed of the bidirectional optical semiconductor device described in the eighth embodiment.

By thus using the low-cost optical semiconductor devices providing long-term reliability, a bidirectional system with a long transmission distance can be implemented at low cost despite a generally high cost rate of an optical semiconductor device to an optical transmission system.

Although the present embodiment has used signal light at a wavelength of 1.3 μm, similar effects can be achieved even when an optical transmission system operating at a wavelength of 1.55 μm or a short-wavelength signal light source is used instead.

What is claimed is:

1. A semiconductor light-receiving device comprising:
   a substrate having a groove for a buried optical fiber, said optical fiber groove being formed in a main surface of the substrate to extend from one end of the substrate to the other end thereof;
   an optical fiber buried in said optical fiber groove to be covered with a resin material;
   a semiconductor light-receiving element having a light-receiving portion at a surface thereof in opposing relation to the main surface of said substrate, said semiconductor light-receiving element being disposed on the main surface of said substrate via a bump such that said light-receiving portion is opposed to said optical fiber;
   an optical member disposed in said substrate to intersect said optical fiber, said optical member reflecting or diffracting signal light propagated through said optical fiber and irradiating said light-receiving portion of said semiconductor light-receiving element with the reflected or diffracted signal light; and
   a holder disposed in said substrate to suppress a temperature-dependent variation in a width of said optical fiber groove.

2. A semiconductor light-receiving device according to claim 1, wherein said holder has a linear expansion coefficient substantially the same as that of said substrate.

3. A semiconductor light-receiving device according to claim 1, wherein said holder has a linear expansion coefficient substantially the same as that of said semiconductor light-receiving element.

4. A bidirectional optical semiconductor device comprising:
   the semiconductor light-receiving device as recited in claim 1; and
   a semiconductor light-emitting element for outputting signal light, said semiconductor light-emitting element being connected to an end of the optical fiber away from which the signal light received by said semiconductor light-receiving device is propagated.

5. An optical transmission system comprising:
   a bidirectional optical semiconductor device having a semiconductor light-emitting element for emitting signal light and a semiconductor light-receiving element for receiving the signal light; and
   an optical fiber for transmitting said signal light,
   said bidirectional optical semiconductor device being composed of the bidirectional optical semiconductor device as recited in claim 4.

6. An optical transmission system comprising:
   a semiconductor light-emitting device for emitting signal light;
   a transmission line for transmitting said signal light; and
   a semiconductor light-receiving device for receiving the signal light transmitted by said transmission line,
   said semiconductor light-receiving device being composed of the semiconductor light-receiving device as recited in claim 1.

7. A semiconductor light-receiving device comprising:
   a substrate having a groove for a buried optical fiber, said optical fiber groove being formed in a main surface of the substrate to extend from one end of the substrate to the other end thereof said optical fiber groove having a cross section which is rectangular;
   an optical fiber buried in said optical fiber groove;
   a semiconductor light-receiving element having a light-receiving portion at a surface thereof in opposing relation to the main surface of said substrate, said semiconductor light-receiving element being disposed on the main surface of said substrate via a bump such that said light-receiving portion is opposed to said optical fiber; and
   an optical member disposed in said substrate to intersect said optical fiber, said optical member reflecting or diffracting signal light propagated through said optical fiber and irradiating said light-receiving portion of said semiconductor light-receiving element with the reflected or diffracted signal light,
   said optical fiber being fixed in said optic al fiber groove with a resin material filled in a gap between said optical fiber groove and said optical fiber in a region of said substrate in opposing relation to said semiconductor light-receiving element and with a fixing member made of a material different from said resin material disposed in a gap between said optical fiber groove and said optical fiber in a region of said substrate not in opposing relation to said semiconductor light-receiving element.

8. A semiconductor light-receiving device according to claim 7, wherein said fixing member is made of a solder material.

9. A semiconductor light-receiving device according to claim 7, wherein said fixing member is made of a glass material.

10. A bidirectional optical semiconductor device comprising:
    the semiconductor light-receiving device as recited in claim 7; and
    a semiconductor light-emitting element for outputting signal light, said semiconductor light-emitting element being connected to an end of the optical fiber away from which the signal light received by said semiconductor light-receiving device is propagated.

11. An optical transmission system comprising:
a bidirectional optical semiconductor device having a semiconductor light-emitting element for emitting signal light and a semiconductor light-receiving element for receiving the signal light; and
an optical fiber for transmitting said signal light,
said bidirectional optical semiconductor device being composed of the bidirectional optical semiconductor device as recited in claim 10.

12. An optical transmission system comprising:
a semiconductor light-emitting device for emitting signal light;
a transmission line for transmitting said signal light; and
a semiconductor light-receiving device for receiving the signal light transmitted by said transmission line,
said semiconductor light-receiving device being composed of the semiconductor light-receiving device as recited in claim 7.

13. A semiconductor light-receiving device comprising:
a substrate having a groove for a buried optical fiber, said optical fiber groove being formed in a main surface of the substrate to extend from one end of the substrate to the other end thereof;
an optical fiber buried in said optical fiber groove to be covered with a resin material;
a semiconductor light-receiving element having a light-receiving portion at a surface thereof in opposing relation to the main surface of said substrate, said semiconductor light-receiving element being disposed on the main surface of said substrate via a bump such that said light-receiving portion is opposed to said optical fiber; and
an optical member disposed in said substrate to intersect said optical fiber, said optical member reflecting or diffracting signal light propagated through said optical fiber and irradiating said light-receiving portion of said semiconductor light-receiving element with the reflected or diffracted signal light, wherein
a patterned electrode made of gold and electrically connected to said bump is formed on a region of the main surface of said substrate located on a side of said optical fiber groove and
a metal thin film is formed between said patterned electrode and said bump.

14. A semiconductor light-receiving device according to claim 13, wherein
said bump is made of a solder material containing lead and tin and
said metal thin film contains at least one of nickel, platinum, titanium, and chromium.

15. A semiconductor light-receiving device according to claim 13, wherein
said bump is made of a solder material containing lead and tin and
said metal thin film is made of a solder material containing indium.

16. A bidirectional optical semiconductor device comprising:
the semiconductor light-receiving device as recited in claim 13; and
a semiconductor light-emitting element for outputting signal light, said semiconductor light-emitting element being connected to an end of the optical fiber away from which the signal light received by said semiconductor light-receiving device is propagated.

17. An optical transmission system comprising:
a bidirectional optical semiconductor device having a semiconductor light-emitting element for emitting signal light and a semiconductor light-receiving element for receiving the signal light; and
an optical fiber for transmitting said signal light,
said bidirectional optical semiconductor device being composed of the bidirectional optical semiconductor device as recited in claim 16.

18. An optical transmission system comprising:
a semiconductor light-emitting device for emitting signal light;
a transmission line for transmitting said signal light; and
a semiconductor light-receiving device for receiving the signal light transmitted by said transmission line,
said semiconductor light-receiving device being composed of the semiconductor light-receiving device as recited in claim 13.

19. A semiconductor light-receiving device comprising:
a substrate having a groove for a buried optical fiber, said optical fiber groove being formed in a main surface of the substrate to extend from one end of the substrate to the other end thereof;
an optical fiber buried in said optical fiber groove to be covered with a resin material;
a semiconductor light-receiving element having a light-receiving portion at a surface thereof in opposing relation to the main surface of said substrate, said semiconductor light-receiving element being disposed on the main surface of said substrate via a bump such that said light-receiving portion is opposed to said optical fiber; and
an optical member disposed in said substrate to intersect said optical fiber, said optical member reflecting or diffracting signal light propagated through said optical fiber and irradiating said light-receiving portion of said semiconductor light-receiving clement with the reflected or diffracted signal light,
said bump being composed of a multilayer film containing a solder material and a metal having a melting point hither than that of said solder material.

20. A semiconductor light-receiving device according to claim 19, wherein said multilayer film is composed of solder materials different in composition and stacked in layers.

21. A semiconductor light-receiving device according to claim 19, wherein said multilayer film contains a layer made of gold.

22. A bidirectional optical semiconductor device comprising:
the semiconductor light-receiving device as recited in claim 19; and
a semiconductor light-emitting element for outputting signal light, said semiconductor light-emitting element being connected to an end of the optical fiber away from which the signal light received by said semiconductor light-receiving device is propagated.

23. An optical transmission system comprising:
a bidirectional optical semiconductor device having a semiconductor light-emitting element for emitting signal light and a semiconductor light-receiving element for receiving the signal light; and
an optical fiber for transmitting said signal light, said bidirectional optical semiconductor device being composed of the bidirectional optical semiconductor device as recited in claim 22.

24. An optical transmission system comprising:

a semiconductor light-emitting device for emitting signal light;

a transmission line for transmitting said signal light; and a semiconductor light-receiving device for receiving the signal light transmitted by said transmission line,
said semiconductor light-receiving device being composed of the semiconductor light-receiving device as recited in claim 19.

25. A semiconductor light-receiving device comprising:

a substrate having a groove for a buried optical fiber, said optical fiber groove being formed in a main surface of the substrate to extend from one end of the substrate to the other end thereof;

an optical fiber buried in said optical fiber groove to be covered with a resin material;

a semiconductor light-receiving element having a light-receiving portion at a surface thereof in opposing relation to the main surface of said substrate, said semiconductor light-receiving element being disposed on the main surface of said substrate via a bump such that said light-receiving portion is opposed to said optical fiber; and an optical member disposed in said substrate to intersect said optical fiber, said optical member reflecting or diffracting signal light propagated through said optical fiber and irradiating said light-receiving portion of said semiconductor light-receiving element with the reflected or diffracted signal light, wherein an electrode terminal made of gold is formed on the surface of said semiconductor light-receiving element provided with said light-receiving portion and a metal thin film is formed between said electrode terminal and said bump.

26. A semiconductor light-receiving device according to claim 25, wherein said bump is made of a solder material containing lead and in and said metal thin film contains at least one of nickel, platinum, titanium, and chromium.

27. A semiconductor light-receiving device according to claim 25, wherein said bump is made of a solder material containing lead and tin and said metal thin film is made of a solder material containing indium.

28. A bidirectional optical semiconductor device comprising:

the semiconductor light-receiving device as recited in claim 25; and a semiconductor light-emitting element for outputting signal light, said semiconductor light-emitting element being connected to an end of the optical fiber away from which the signal light received by said semiconductor light-receiving device is propagated.

29. An optical transmission system comprising:

a bidirectional optical semiconductor device having a semiconductor light-emitting element for emitting signal light and a semiconductor light-receiving element for receiving the signal light; and an optical fiber for transmitting said signal light, said bidirectional optical semiconductor device being composed of the bidirectional optical semiconductor device as recited in claim 28.

30. An optical transmission system comprising:

a semiconductor light-emitting device for emitting signal light;

a transmission line for transmitting said signal light; and a semiconductor light-receiving device for receiving the signal light transmitted by said transmission line,
said semiconductor light-receiving device being composed of the semiconductor light-receiving device as recited in claim 25.

31. A method of manufacturing a semiconductor light-receiving device, comprising the steps of:

forming a patterned electrode on a main surface of a substrate;

forming a bump on said patterned electrode;

forming a groove for a buried optical fiber in the main surface of said substrate such that said optical fiber groove extends from one end of the substrate to the other end thereof;

burying an optical fiber in the said optical fiber groove and filling a resin material transparent at a wavelength of signal light propagated through said optical fiber and having a refractive index substantially the same as that of said optical fiber in a gap between said optical fiber groove and said optical fiber;

providing said substrate with a holder for suppressing a temperature-dependent variation in a width of said optical fiber groove;

providing said substrate with an optical member for reflecting or diffracting the signal light propagated through said optical fiber and emitting the reflected or diffracted signal light upwardly of the main surface of said substrate such that said optical member intersects said optical fiber groove; and fixing, to said substrate, a semiconductor light-receiving element having a light-receiving portion formed with an electrode terminal such that said light-receiving portion is irradiated with said reflected or diffracted signal light from said optical member and that said electrode terminal is brought in contact with said bump.

32. A method of manufacturing a semiconductor light-receiving device, comprising the steps of:

forming a patterned electrode on a region of a main surface of a substrate to be provided with a semiconductor light-receiving element;

forming a bump on said patterned electrode on the main surface of said substrate;

forming a groove for a buried optical fiber in the main surface of said substrate such that said optical fiber groove extends from one end of the substrate to the other end thereof and has a cross section which is rectangular;

burying an optical fiber in the said optical fiber groove and disposing a fixing member for fixing said optical fiber to said substrate in a gap between said optical fiber groove and said optical fiber except in the region of said substrate to be provided with the light-receiving element;

filling a resin material different from a material forming said fixing member transparent at a wavelength of signal light propagated through said optical fiber and having a refractive index substantially the same as that of said optical fiber in the gap between said optical fiber groove and said optical fiber in the region of said substrate to be provided with the light-receiving element;

providing said substrate with an optical member for reflecting or diffracting the signal light propagated through said optical fiber and emitting the reflected or diffracted signal light upwardly of the main surface of said substrate such that said optical member intersects said optical fiber groove; and fixing, to said substrate, the semiconductor light-receiving element having a light-receiving portion formed with an electrode terminal such that said light-receiving portion is irradiated with said reflected or diffracted signal light from said optical member and that said electrode terminal is brought in contact with said bump.

33. A method of manufacturing a semiconductor light-receiving device according to claim 32, wherein said fixing member is made of a solder material.

34. A method of manufacturing a semiconductor light-receiving device according to claim 32, wherein said fixing member is made of a glass material.

* * * * *